United States Patent
Xu et al.

(10) Patent No.: US 11,671,436 B1
(45) Date of Patent: Jun. 6, 2023

(54) COMPUTATIONAL FRAMEWORK FOR MODELING ADVERSARIAL ACTIVITIES

(71) Applicant: HRL Laboratories, LLC, Malibu, CA (US)

(72) Inventors: Jiejun Xu, Diamond Bar, CA (US); Kang-Yu Ni, Calabasas, CA (US); Alexei Kopylov, Pasadena, CA (US); Shane M. Roach, San Francisco, CA (US); Tsai-Ching Lu, Thousand Oaks, CA (US)

(73) Assignee: HRL LABORATORIES, LLC, Malibu, CA (US)

( * ) Notice: Subject to any disclaimer, the term of this patent is extended or adjusted under 35 U.S.C. 154(b) by 325 days.

(21) Appl. No.: 17/021,542

(22) Filed: Sep. 15, 2020

Related U.S. Application Data

(60) Provisional application No. 62/952,913, filed on Dec. 23, 2019.

(51) Int. Cl.
*H04L 9/40* (2022.01)
*G06F 16/2457* (2019.01)

(52) U.S. Cl.
CPC .... *H04L 63/1425* (2013.01); *G06F 16/24578* (2019.01)

(58) Field of Classification Search
USPC .......................................................... 726/22
See application file for complete search history.

(56) References Cited

U.S. PATENT DOCUMENTS

| | | | | |
|---|---|---|---|---|
| 8,533,825 | B1* | 9/2013 | Marsa | H04L 63/1425 726/22 |
| 9,911,039 | B1* | 3/2018 | Brost | G06T 7/70 |
| 11,201,890 | B1* | 12/2021 | Coull | H04L 63/1416 |
| 2015/0188941 | A1* | 7/2015 | Boshmaf | H04L 63/1441 726/22 |
| 2015/0195299 | A1* | 7/2015 | Zoldi | H04L 63/1441 726/25 |
| 2020/0004888 | A1* | 1/2020 | Rossi | G06F 16/9032 |
| 2020/0167785 | A1* | 5/2020 | Kursun | H04L 43/045 |
| 2020/0201910 | A1* | 6/2020 | Gavaudan | G06Q 20/32 |
| 2020/0349466 | A1* | 11/2020 | Hoogerwerf | G06N 5/045 |

OTHER PUBLICATIONS

Weinstein, Clifford, et al. Modeling and Detection Techniques for Counter-Terror Social Network Analysis and Intent Recognition. Aerospace Conference, 2009 IEEE. IEEE, 2009, pp. 1-16.

(Continued)

*Primary Examiner* — Sakinah White Taylor
(74) *Attorney, Agent, or Firm* — Tope-McKay & Associates

(57) ABSTRACT

Described is a system for producing indicators and warnings of adversarial activities. The system receives multiple networks of transactional data from different sources. Each node of a network of transactional data represents an entity, and each edge represents a relation between entities. A worldview graph is generated by merging the multiple networks of transactional data. Suspicious subgraph regions related to an adversarial activity are identified in the worldview graph through activity detection. The suspicious subgraph regions are used to generate and transmit an alert of the adversarial activity.

12 Claims, 24 Drawing Sheets

(56) References Cited

OTHER PUBLICATIONS

Campbell, William, et al. Social Network Analysis with Content and Graphs. MIT Lincoln Laboratory Journal 20: pp. 62-81. 2013.
Smith, Steven T., et al. Covert Network Detection. Lincoln Laboratory Journal vol. 20, No. 1, 2013, pp. 47-61.
F. Krzakala, C. Moore, E. Mossel, J. Neeman, A. Sly, L. Zde-borov, P. Zhang. Spectral Redemption in Clustering Sparse Networks. In Proceedings of the National Academy of Sciences (PNAS), 2013, vol. 110, No. 52, pp. 20935-20940.
Money Laundering at Lebanese Bank. Taken from archive.nytimes.com/www.nytimes.com/interactive/2011/12/13/world/middleeast/lebanese-money-laundering.html?ref=middleeast, downloaded on Nov. 5, 2020.
D. Koutra, H. Tong, and D. Dubinsky. Big-Align: Fast Bipartite Graph Alignment. In IEEE International Conference on Data Mining (ICDM), 2013, pp. 389-398.
K. Shvachko, H. Kuang, S. Radia, and R. Chansler. The Hadoop Distributed File System. In IEEE 26th Symposium on Mass Storage Systems and Technologies (MSST), 2010, pp. 1-10.
V. K. Vavilapalli, A. C. Murthy, Chris Douglas, S. Agarwal, M. Konar, R. Evans, T. Graves, J. Lowe, H Shah, S Seth, B. Saha, C. Curino, O. O'Malley, S. Radia, B. Reed, E. Baldeschwieler. Apache Hadoop YARN: Yet Another Resource Negotiator. In SoCC, 2013, pp. 1-16.
M. Zaharia, M. Chowdhury, M. J. Franklin, S. Shenker, and I. Stoica. Spark: Cluster Computing with Working Sets. In USENIX HotCloud, 2010, pp. 1-7.
M. Krivelevich and B. Sudakov. The Largest Eigenvalue of Sparse Random Graphs. Combinatorics, Probability and Computing (2003) 12, pp. 61-72.
D. A. Spielman and S.-H. Teng. Nearly-Linear Time Algorithms for Preconditioning and Solving Symmetric, Diagonally Dominant Linear Systems. In SIAM Journal on Matrix Analysis and Applications, 2014, vol. 35, No. 3, pp. 835-885.
J. Ham, D. Lee, and L. Saul. Semisupervised Alignment of Manifolds. In Proc. 10th Int'l Workshop Artificial Intelligence and Statistics, 2005, pp. 120-127.
C. Wang, S. Mahadevan. A General Framework for Manifold Alignment. In AAAI Fall Symposium on Manifold Learning and its Application, 2009, pp. 79-86.
H. Tong, C. Faloutsos, B. Gallagher, and T Eliassi-Rad. Fast Best-Effort Pattern Matching in Large Attributed Graphs. In ACM SIGKDD Conference on Knowledge Discovery and Data Mining, 2007, pp. 737-746.
J. Tang Zhang, C. Ma, H. Tong, Y. Jing, J. Li: Panther: Fast Top-k Similarity Search on Large Networks. In ACM SIGKDD Conference on Knowledge Discovery and Data Mining, 2015, pp. 1445-1454.
W. Aiello, F. Chung, and L. Lu. A random graph model for power law graphs. Exp. Math. 10, pp. 53-66, 2001.

\* cited by examiner

| | | |
|---|---|---|
| Big-Align[9]: | $Z(F) = \mathcal{T}(A_1, A_2)$ | |
| BRG[10]: | $Z(\hat{F}) = \mathcal{T}(A_1, A_2) + \mathcal{H}(Y)$ | |
| FASCINATE[12]: | $Z(\hat{F}) = \sum_{i,j=1}^{g} \mathcal{T}(A_i, A_j) + \sum_{i=1}^{g} \mathcal{H}(Y_i) + \sum_{i=1}^{g} \mathcal{R}(F_i)$ | |
| FINAL[11]: | $Z(\hat{F}) = \mathcal{J}(\mathcal{T}(A_1, A_2), \mathcal{N}, \mathcal{E}) + \mathcal{H}(Y)$ | |

$Z$: objective function;
$A_i$: adjacency matrix of an input graph
$\mathcal{T}$: term for topology consistency
$Y$: partially observed node correspondence matrix (optional)
$\mathcal{H}$: term to enforce initial correspondence
$g$: number of input networks
$\mathcal{R}$: term for low-rank regularization
$\mathcal{J}$: term for node and edge consistency
$F/\hat{F}$: final node correspondence matrix (one-to-one or probabilistic association)

FIG. 7

| Dataset | Alignment Accuracy | Dataset | Alignment Accuracy |
|---|---|---|---|
| B0 | 96.43% | B6 | 95.91% |
| B1 | 95.89% | B7 | 97.36% |
| B2 | 96.43% | B8 | 96.43% |
| B3 | 96.21% | B9 | 97.47% |
| B4 | 96.44% | B10 | 96.41% |
| B5 | 96.05% | B11 | 97.08% |

FIG. 12

| Worldview Graph | nDCG | AP | AUROC |
|---|---|---|---|
| 1 | 94.00% | 96.0% | 97.3% |
| 2 | 87.2% | 73.2% | 93.2% |
| 3 | 93.0% | 82.1% | 83.4% |
| 4 | 98.3% | 96.6% | 98.7% |
| 5 | 98.0% | 92.1% | 98.9% |
| 6 | 100.0% | 100.0% | 100.0% |
| 7 | 98.7% | 92.1% | 99.8% |
| 8 | 100.0% | 99.9% | 100.0% |
| 9 | 100.0% | 99.9% | 100.0% |
| 10 | 90.20% | 87.2% | 92.2% |

FIG. 13

| Channel 1 | Channel 2 | % of directed edges of Channel 2 that are also present in Channel 1 | % of unidirected edges of Channel 2 that are also present in Channel 1 |
|---|---|---|---|
| Calls | Emails | 2.59% | 3.44% |
| Emails | Calls | 3.53% | 4.68% |
| Calls | Purchases | ~0 | ~0 |
| Purchases | Calls | ~0 | ~0 |
| Calls | Meetings | 0.0031% | 0.0039% |
| Meetings | Calls | ~0 | ~0 |
| Emails | Purchases | 0 | 0 |
| Purchases | Emails | 0 | 0 |
| Emails | Meetings | 0.0024% | 0.0031% |
| Meetings | Emails | ~0 | ~0 |
| Purchases | Meetings | 0 | 0 |
| Meetings | Purchases | 0 | 0 |

FIG. 14

| Channel | Average Clustering Coefficient Estimate |
|---|---|
| Calls | 0.06257 |
| Emails | 0.06118 |
| Meetings | 0.00001 |
| Purchases | 0.00000 |

FIG. 18

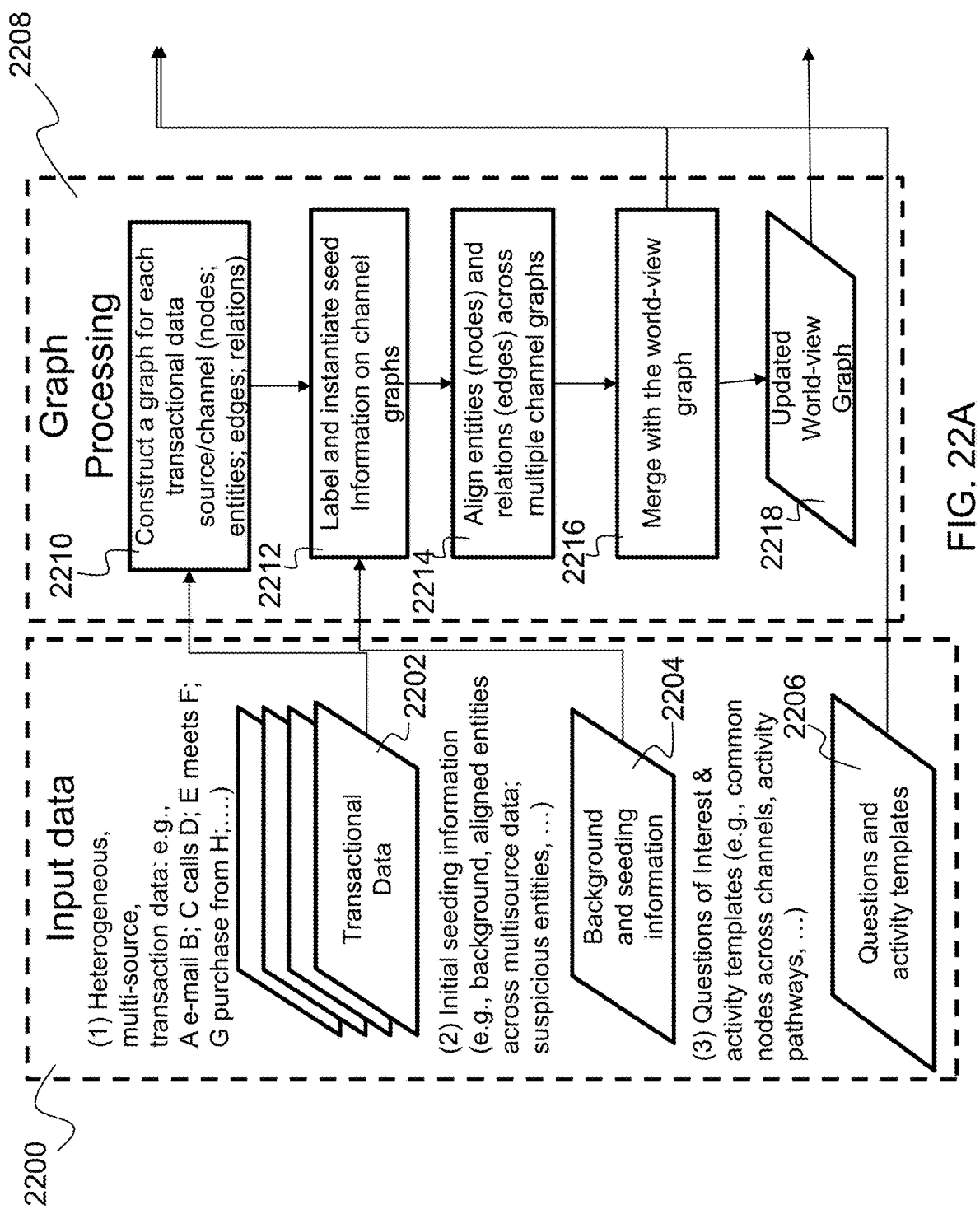

COMPUTATIONAL FRAMEWORK FOR MODELING ADVERSARIAL ACTIVITIES

GOVERNMENT LICENSE RIGHTS

This invention was made with government support under U.S. Government Contract Number FA8750-17-C-0153 awarded by DARPA. The government has certain rights in the invention.

CROSS-REFERENCE TO RELATED APPLICATIONS

This is a Non-Provisional Application of U.S. Provisional Patent Application No. 62/952,913, filed Dec. 23, 2019, entitled, "A Computational Framework for Modeling Adversarial Activities", the entirety of which is incorporated herein by reference.

BACKGROUND OF INVENTION

(1) Field of Invention

The present invention relates to a system for modeling adversarial activities and, more particularly, to a system for modeling adversarial activities using an integrated analysis of multiple dynamic and heterogeneous networks.

(2) Description of Related Art

The ability to model adversarial activities is essential to the goal of producing indications and warnings of efforts of maliciousness by adversaries. An approach for modeling, detection, and tracking of terrorist groups and their intents based on social media and multimedia data was published in Literature Reference Nos. 1 and 2 of the List of Incorporated Literature References. However, this method is largely based on Named Entity Recognition (NER) from the Natural Language Processing (NLP) domain. For example, the identity correspondence of a person (across different transaction networks) is estimated based on NER. This type of technique is sensitive to the noise in real-world data.

Additionally, an approach for detecting covert terrorist groups from multi-intelligent datasets was proposed in Literature Reference No. 3. However, this work does not explicitly address the alignment problem, which is linking user identities across text and other communication networks. In fact, it assumes such alignment has been done a priori. Furthermore, the main emphasis of this work is on unsupervised threat detection (i.e., similar to anomaly detection), and does not support finding sub-networks which matches a specified threat template.

Thus, a continuing need exits for a system for modeling adversarial activities that is tolerant to noisy inputs using a computation framework using both network merging and activity detection components.

SUMMARY OF INVENTION

The present invention relates to a system for modeling adversarial activities and, more particularly, to a system for modeling adversarial activities using an integrated analysis of multiple dynamic and heterogeneous networks. The system comprises one or more processors and a non-transitory computer-readable medium having executable instructions encoded thereon such that when executed, the one or more processors perform multiple operations. The system receives a plurality of networks of transactional data from different sources. Each network of transactional data comprises a plurality of nodes and edges connecting nodes, where each node represents an entity and each edge represents a relation between entities. A worldview graph was generated by merging the plurality of networks of transactional data. A set of suspicious subgraph regions in the worldview graph is identified through activity detection. Based on the set of suspicious subgraph regions, an alert of the adversarial activity is generated and transmitted.

In another aspect, in identifying the set of suspicious subgraph regions in the worldview graph, the system performs a query of the worldview graph with a query graph describing a pathway template of a specific adversarial activity; identifies a set of subgraph regions that match the query graph, resulting in the set of suspicious subgraph regions; ranks the set of suspicious subgraph regions based on similarity to the query graph; and outputs a ranked list of the set of suspicious subgraphs to an end-user.

In another aspect, wherein the plurality of networks of transactional data are merged together using a optimization-based alignment framework based on a combination of topological features of the plurality of networks of transactional data and attribute information related to the plurality of nodes.

In another aspect, adjacency matrices of the plurality of networks of transactional data are approximated via a rank-r eigen-value decomposition, and using the optimization-based alignment framework, an optimization is performed based on a joint matrix composed of the approximated adjacency matrices.

In another aspect, a preconditioning step is conducted between pairs of communities in adjacency matrices prior to generation of the joint matrix.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 7 is a table of high-level optimization functions for network alignment according to some embodiments of the present disclosure;

FIG. 12 is a table of network alignment results according to some embodiments of the present disclosure;

FIG. 13 is a table of subgraph discovery performance for worldview graphs according to some embodiments of the present disclosure;

FIG. 14 is a table of percentages of overlapping edges between pairs of channels according to some embodiments of the present disclosure;

FIG. 18 is a table of average clustering coefficient estimates of four communication channels according to some embodiments of the present disclosure;

FIG. 22A is an illustration of an input data module and a graph processing module of the system for modeling adversarial activities according to some embodiments of the present disclosure;

DETAILED DESCRIPTION

Figure 1:
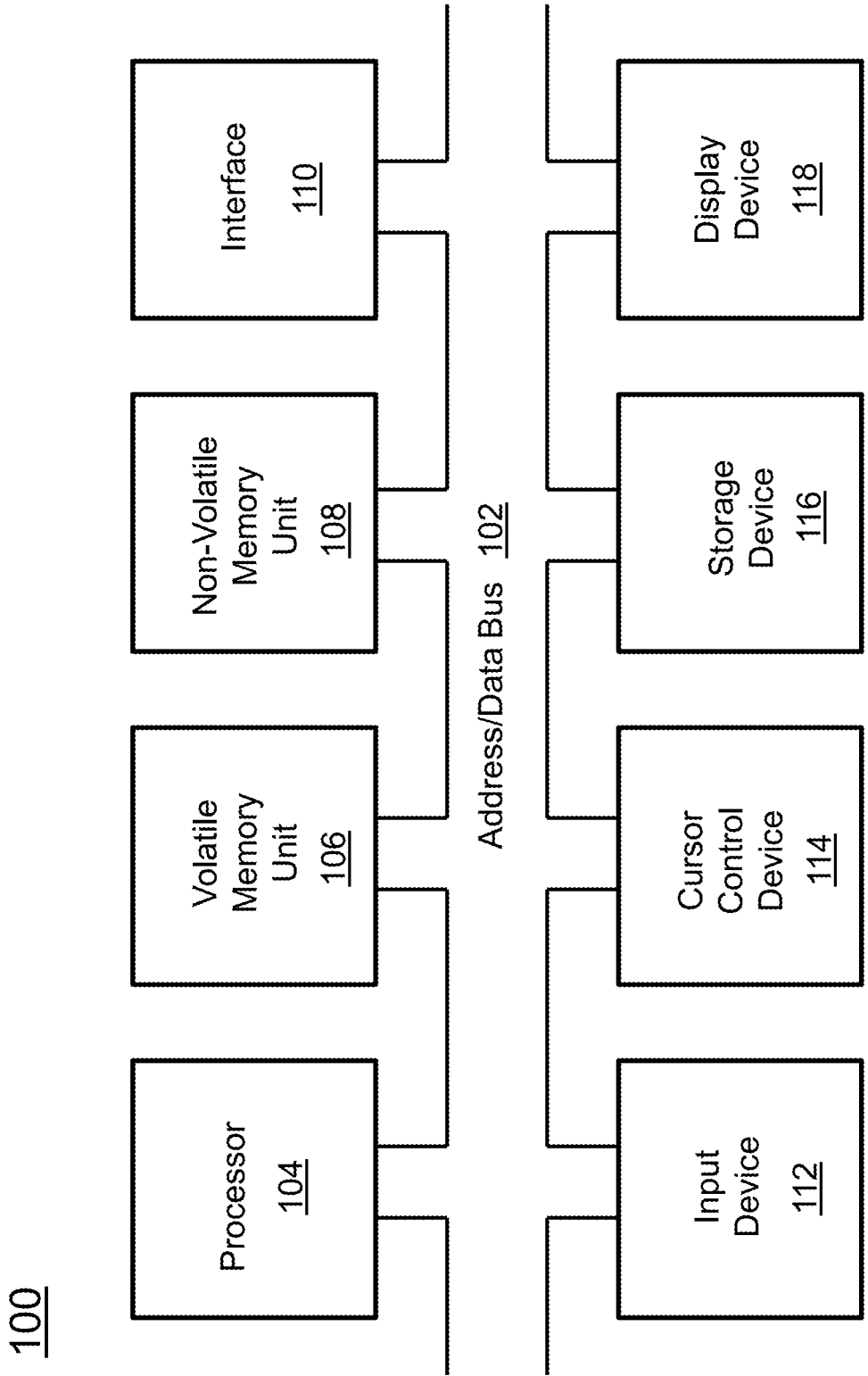
FIG. 1 is a block diagram depicting the components of a system for modeling adversarial activities according to some embodiments of the present disclosure.

The present invention relates to a system for modeling adversarial activities and, more particularly, to a system for modeling adversarial activities using an integrated analysis of multiple dynamic and heterogeneous networks. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Weinstein, Clifford, et al. Modeling and Detection Techniques for Counter-Terror Social Network Analysis and Intent Recognition. Aerospace Conference, 2009 IEEE. IEEE, 2009.
2. Campbell, William, et al. Social Network Analysis with Content and Graphs. MIT Lincoln Laboratory Journal 20: 62-81. 2013.
3. Smith, Steven T., et al. Covert Network Detection. Lincoln Laboratory Journal 20.1 (2013): 3-1.
4. F. Krzakala, C. Moore, E. Mossel, J. Neeman, A. Sly, L. Zde-borov, P. Zhang. Spectral Redemption in Clustering Sparse Networks. In Proceedings of the National Academy of Sciences (PNAS), 2013.
5. Money Laundering at Lebanese Bank. Taken from archive.nytimes.com/www.nytimes.com/interactive/2011/12/13/world/middle east/lebanese-money-laundering.html?ref=middleeast.
6. D. Koutra, H. Tong, and D. Dubinsky. Big-Align: Fast Bipartite Graph Alignment. In IEEE International Conference on Data Mining (ICDM), 2013
7. K. Shvachko, H. Kuang, S. Radia, and R. Chansler. The Hadoop Distributed File System. In IEEE 26th Symposium on Mass Storage Systems and Technologies (MSST), 2010.
8. V. K. Vavilapalli, A. C. Murthy, Chris Douglas, S. Agarwal, M. Konar, R. Evans, T. Graves, J. Lowe, H Shah, S Seth, B. Saha, C. Curino, O. O'Malley, S. Radia, B. Reed, E. Baldeschwieler. Apache Hadoop YARN: Yet Another Resource Negotiator. In SoCC, 2013.
9. M. Zaharia, M. Chowdhury, M. J. Franklin, S. Shenker, and I. Stoica. Spark: Cluster Computing with Working Sets. In USENIX HotCloud, 2010.
10. Apache Spark MLlib. Taken from spark.apache.org/mllib/.
11. Apache Mahout: Scalable Machine-Learning and Data-Mining Library. Taken from mahout.apache.org/overview.html.
12. D. Lyubimov, A. Palumbo. Apache Mahout: Beyond MapReduce. Distributed Algorithm Design, 2016.
13. F. Krzakala, C. Moore, E. Mossel, J. Neeman, A. Sly, L. Zde-borov, P. Zhang. Spectral Redemption in Clustering Sparse Networks. In Proceedings of the National Academy of Sciences (PNAS), 2013.
14. M. Krivelevich and B. Sudakov. The Largest Eigenvalue of Sparse Random Graphs. Combinatorics, Probability and Computing, 2003.
15. D. A. Spielman and S.-H. Teng. Nearly-Linear Time Algorithms for Preconditioning and Solving Symmetric, Diagonally Dominant Linear Systems. In SIAM Journal on Matrix Analysis and Applications, 2014.
16. J. Ham, D. Lee, and L. Saul. Semisupervised Alignment of Manifolds. In Proc. 10th Int'l Workshop Artificial Intelligence and Statistics, 2005.
17. C. Wang, S. Mahadevan. A General Framework for Manifold Alignment. In AAAI Fall Symposium on Manifold Learning and its Application, 2009.
18. H. Tong, C. Faloutsos, B. Gallagher, and T Eliassi-Rad. Fast Best-Effort Pattern Matching in Large Attributed Graphs. In ACM SIGKDD Conference on Knowledge Discovery and Data Mining, 2007.
19. J. Tang Zhang, C. Ma, H. Tong, Y. Jing, J. Li: Panther: Fast Top-k Similarity Search on Large Networks. In ACM SIGKDD Conference on Knowledge Discovery and Data Mining, 2015.
20. W. Aiello, F. Chung, and L Lu. A random graph model for power law graphs. Exp. Math. 10, 53-66, 2001.

(2) Principal Aspects

Various embodiments of the invention include three "principal" aspects. The first is a system for modeling adversarial activities. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 104. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 104. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
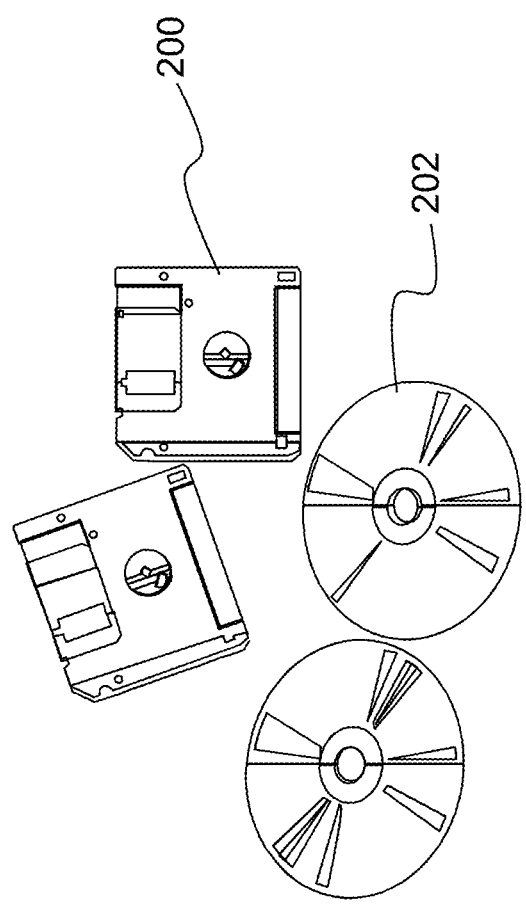
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Figure 3:
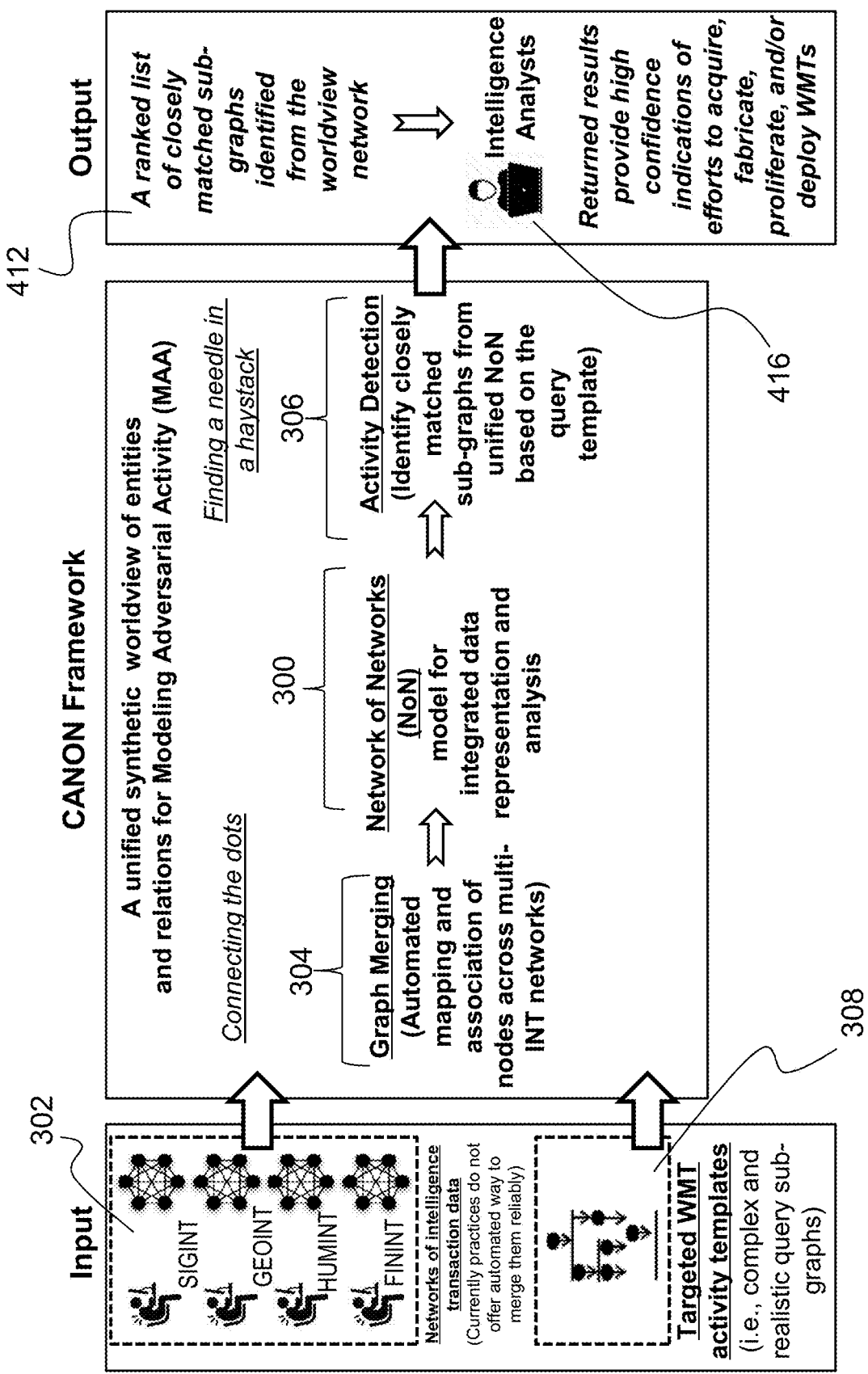
FIG. 3 is an illustration of the Complex Analytics of Network of Networks (CANON) framework for identifying high-confidence adversarial activity leads based on integrated analysis of a worldview model according to some embodiments of the present disclosure.

Described herein is a system and method to provide a unique computational system for an integrated analysis of multiple dynamic and heterogeneous networks that will have a direct impact on modeling adversarial activities (e.g., smuggling, human trafficking, illicit drug production, activities linked to weapons of mass terrorism). FIG. 3 depicts the concept of operation and illustrates at a high-level how the technologies will work together. Central to the Complex Analytics of Network of Networks (CANON) framework is a Network of Networks (NoN) model (element 300) in which nodes and edges can be defined from heterogeneous domains at multiple resolutions. The networks derived using data from different intelligence sources (element 302) are optimally merged together (i.e., Graph Merging (element 304)) using a regularized-optimization framework based on a combination of topological features and node/edge attributes (e.g., names), which ensures a high level of alignment/mapping accuracy. Many networks can be modeled with graphs. For instance, in modeling a social network, nodes can correspond to users and edges can correspond to a "retweet" or "like" action. Similarly, in a financial transaction network, nodes can correspond to individuals' bank accounts and edges can indicate a transaction of funds. In the example of a transportation network, nodes can indicate locations/addresses, and edges can indicate a shipment between the two locations/addresses. The framework described herein is meant to apply to all these different networks and, subsequently, align them together.

Due to the large and sparse nature of real-world graphs, special emphasis is placed on tackling both scalability and numerical stability issues in network alignment. Specifically, the computation and matching procedures is accelerated by discovering intrinsic graph structures via low-rank approximation involving a projection of the nodes into a low-dimensional space formed by the matrix basis of the targeted networks. Furthermore, in order to address the potential numerical instability associated with large graphs, a two-stage approach is taken to first transforming the graphs with operators such as the "non-backtracking" matrix (see Literature Reference No. 4), and then conducting alignment between different clusters of the targeted networks in a coarse-to-fine manner to achieve full accuracy and high performance.

With the constructed NoN worldview, CANON enables user queries of adversarial activity templates by formulating the problem as an attributed subgraph matching problem in the worldview network for activity detection (element 306). In contrast to most existing work on subgraph matching, which primarily focuses on node-based attributes, CANON provides full support on graphs with both node and edge attributes. This is crucial as it enables a broad range of complex and realistic queries for adversarial pathway templates in real-world scenarios, where the targeted entities and their relationships are naturally diverse and ever-changing. The output of the CANON framework is a ranked list of closely matched sub-graphs identified from the world-view network (element 412). The ranked list (element 412) is transmitted (e.g., emailed, messaged) or displayed directly via a computer monitor to human intelligence analysts (element 416). The returned results provide high confidence indication of efforts to acquire, fabricate, proliferate, and/or deploy WMTs.

Figure 4:
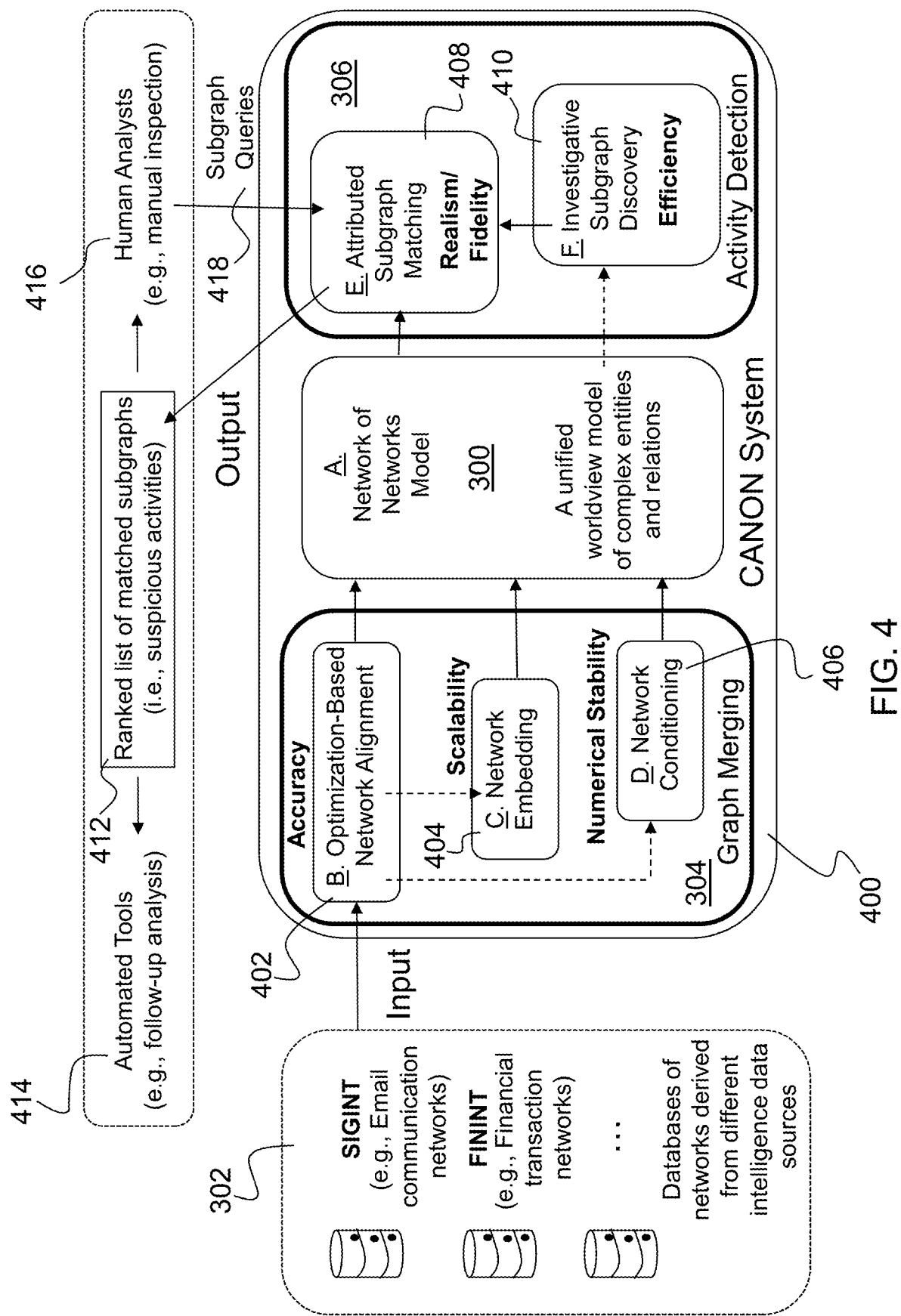
FIG. 4 is an illustration of the CANON system consisting of a set of interconnected modules centered around a unified Network of Networks (NoN) model according to some embodiments of the present disclosure.

The overall design and architecture of CANON (element 400) is illustrated in FIG. 4, which consists of a set of interconnected modules centered around a unified NoN model (element 300). Solid lines represent core workflow, which forms a basic functional system. Dashed lines represent additional steps for optimizing system performance. Bolded text indicates the benefits of the corresponding module. As shown in FIG. 4, networks derived using data from different intelligence sources (element 302) provide input to the CANON (element 400) system. The CANON (element 400) system comprises Graph Merging (element 400), the NoN model (element 300), and Activity Detection (element 306). Graph merging (element 400) includes an optimization-based network alignment module (element 402) for accuracy, a network embedding module (element 404) for scalability, and a network conditioning module (element 406) for numerical stability. Activity Detection (element 306) includes an attributed subgraph matching module (element 408) for realism/fidelity and an investigative subgraph discovery module (element 410) for efficiency. The output of the attributed subgraph matching module (element 408) is a ranked list of matched subgraphs (element 412) (i.e., suspicious activities). The ranked list of matched subgraphs (element 412) can be used by automated tools (element 414) for follow-up analysis, such as automated facial recognition software to assist in obtaining additional information about a suspects' recent activities. In addition, or alternatively, the ranked list of matched subgraphs (element 412) can be used by human analysts (element 416) for manual inspection. In turn, human analysts (element 416) can send subgraph queries (element 418) to the attributed subgraph matching module (element 408). Each of these aspects will be described in further detail.

Foremost among the challenges of modeling adversarial activity is the problem of merging and fusing the information derived from the given multi-sourced transaction data. The inherent difficulty to this challenge was recently made evident in an article published by the New York Times (see Literature Reference No. 5), which reported how analysts were able to successfully unravel a complex money-laundering scheme implicating the Lebanese Canadian Bank in the funding of terrorist groups and illegal drug trafficking. It was only through careful analysis involving a wide variety of transaction-oriented data sources that analysts were able to uncover the scheme.

Figure 5:
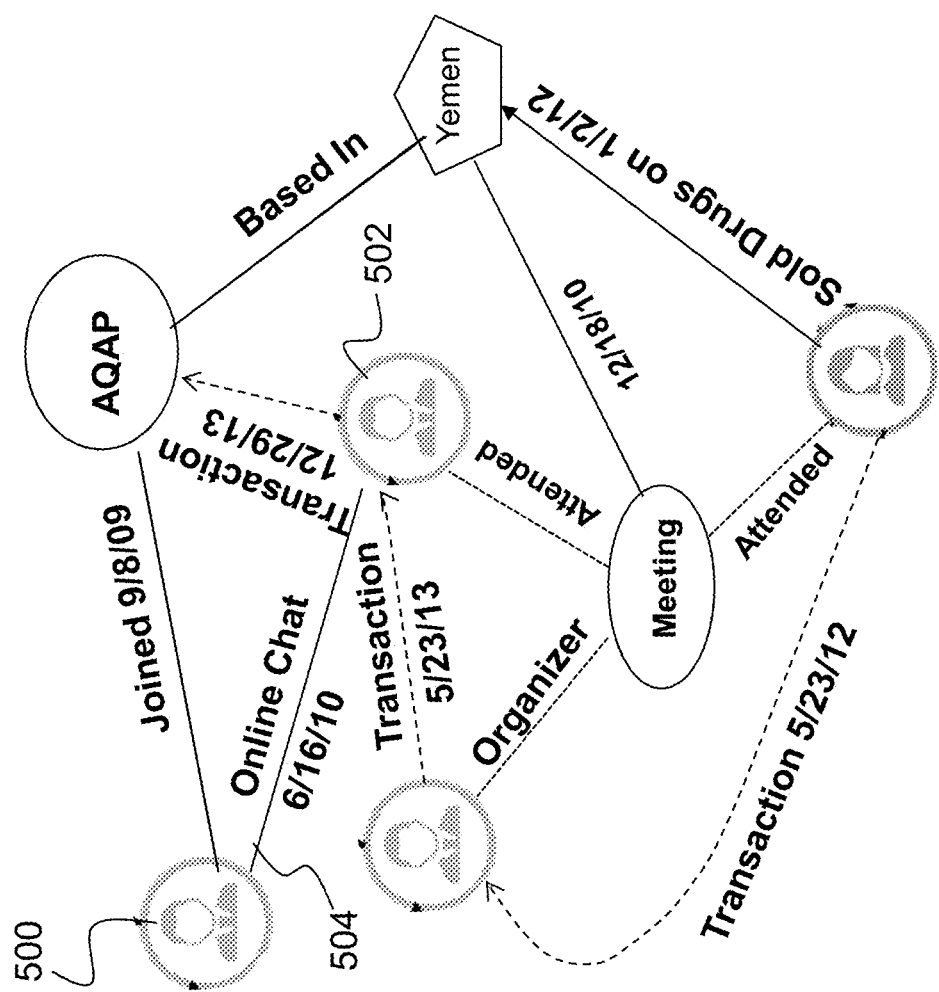
FIG. 5 is an illustration of the complex entities and relationships needed to construct the worldview graph according to some embodiments of the present disclosure.

FIG. 5 shows the kinds of entities (e.g., elements 500 and 502) and relationships (e.g., online chat (element 504)) involved in such a complex activity pathway. Complex entities and relationships are needed to construct the worldview graph. The graphical representation conveys a unifying presentation that readily enables a comprehensive analysis of the underlying activity processes and their proper contexts. Described below is the technical approach for graph creation and merging in order to construct an integrated worldview graph that similarly captures nuanced activity processes and contexts, and serves as the foundation of the CANON (element 400) framework.

(3.1) Network of Networks (NoN) Model (Element 300)

Figure 6:
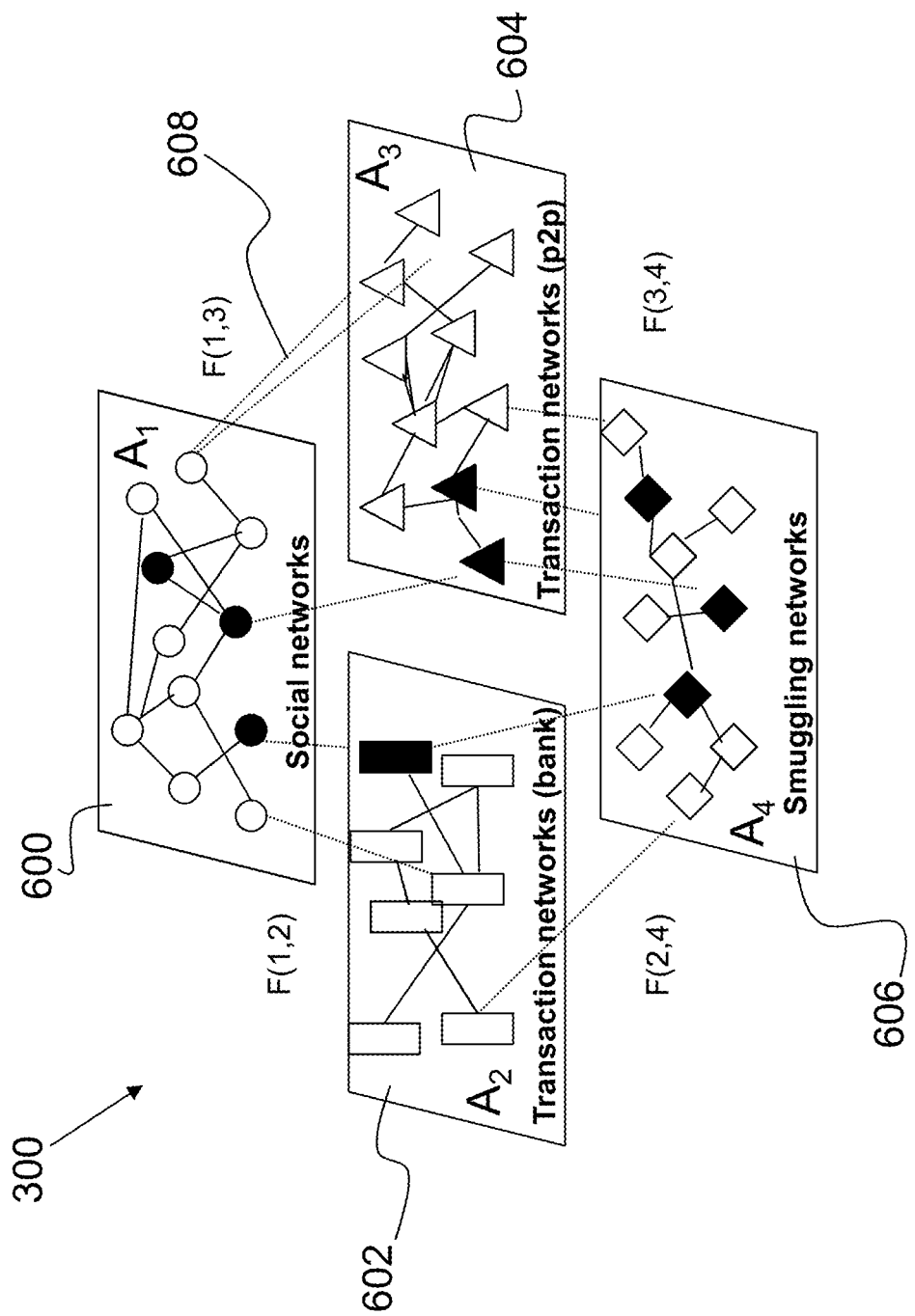
FIG. 6 is an illustration of a NoN model according to some embodiments of the present disclosure.

A unique mathematical model was developed to unify multiple input networks. In this NoN model (element 300), illustrated in FIG. 6, nodes (represented by circles) and edges (represented by lines connecting circles) will be used to represent heterogeneous entities and relationships reflecting the diversity of information domains and resolutions required by modeling adversarial activities. FIG. 5 illustrates an example of a NoN (element 300) with various domain layers (elements 600, 602, 604, and 606) and interlayer links (e.g., element 608) specified by edges in the main graph.

The NoN model (element 300) provides a powerful formalism for modeling multi-sourced interdependent networks. Network layers indicate domain-specific networks, while different types and levels of associations exist among nodes. The formalism allows for the possibility that a single node represented at one resolution can be expanded so as to represent an entire domain-specific network at another resolution. Formally, a NoN model (element 300) is defined by the tuple $R=( G, A, \theta)$, where $G=(V, E)$ is the main network comprised of g vertices; V corresponds to the set of vertices in the main network, and E corresponds to the edges connecting these vertices. A corresponds to the set of individual sub-networks. In other words, $A=\{A_1, \ldots, A_g\}$ is a set of g domain-specific networks $A_i=(V_i, E_i)$ (elements 600, 602, 604, and 606), where $V_i$ and $E_i$ are the corresponding nodes and edges, respectively, in the sub-networks. $\theta: V \rightarrow A$ is a bijection between nodes in G and networks in A. A bijection is a function between the elements of two sets, where each element of one set is paired with exactly one element of the other set. Each element of the other set is paired with exactly one element of the first set.

Nodes in the main network are referred to as main nodes, and nodes in the domain-specific networks are called domain nodes, or simply nodes. The primary advantage of this NoN model (element 300) is that it generalizes many of the existing multi-network models (e.g., multiplex, hypergraph, tensor). For instance, a multiplex network can be viewed as a NoN with two domain-specific networks, both sharing a common vertex set; a hypergraph is a special case of NoN where links in the domain-specific network are absent; and a tensor multi-network is essentially a special case of the NoN model, where the main network is a clique and the domain-specific networks all share a common set of nodes. A clique in the mathematical area of graph theory is a subset of vertices of an undirected graph such that every two distinct vertices in the clique are adjacent.

It is envisioned that this NoN model (element 300) provides a natural way to fully encode the unique characteristics of raw input networks given the following four properties. First, the NoN model (element 300) can admit any number of input layers, each being a domain-specific network (e.g., a social network (element 600)). Second, the basic form of the NoN (element 300) can be mathematically represented as g+1 fully observed matrices (i.e., g for the domain-specific networks and one for the main network). By allowing the main network and/or domain-specific networks to be partial, one can easily characterize the limited knowledge of the input graphs when confronted with noisy or incomplete data. Third, if the matrix representation of a domain-specific network (e.g., a social network (element 600)) is replaced by a dynamic network model, such as a tensor with the third mode being time, it effectively enables modeling the temporal dependency of the input graphs. Fourth, the NoN model (element 300) provides the flexibility to model the alignment among the different layers at different granularities. In its basic form, each edge/link (e.g., element 608) of the main network describes the network-level alignment among two corresponding layers. If a link in the main network is replaced with an adjacency matrix, the complete node-node alignment between two layers can be described.

(3.2) Graph Merging (Element 304)

(3.2.1) Optimization-Based Network Alignment (Element 402)

The approach for instantiating the NoN model (element 300) into a rich, contextual worldview of entities and relationships is to frame the problem as a heterogeneous network integration problem where there are a given multiple domain-specific networks (e.g., transaction networks (elements 602 and 604), communication networks, smuggling networks (element 606), social networks (element 600)), and they are merged together into a unified instance. One of the key challenges that the approach described herein will need to overcome is identifying the node correspondences across (domain-specific) networks. This alignment problem can be formulated as an inter-correlated network matching problem using topological information. For example, imagine one has a similar set of contacts regardless of the communication channels (e.g., phone, text message, emails). There should be correlations among these channels (i.e., inter-correlations). Such correlations can help finding the individual identities. In the graph alignment setting according to embodiments of the present disclosure, this is considered an inter-correlated network matching problem of finding the node correspondence across networks. This is inspired by the previously proposed BigAlign algorithm (see Literature Reference No. 6). This approach made the simplifying assumption that one graph, $A_1$, is a noisy permutation of another graph, $A_2$, and the resulting optimization problem involved finding the row and column alignment matrices P and Q that minimize the expression $\|PA_1Q-A_2\|_F^2$. A bijective mapping between the two graphs was obtained by re-ordering the rows and columns of $A_1$, according to P and Q. However, a significant challenge faced by this approach is on topology inconsistency—the possibility that a pair of affiliated nodes may not have a consistent connectivity structure across the different networks (e.g., connecting to the same or similar set of the neighbors). Making a consistency assumption across networks is likely to be unjustified in many real-world applications. For instance, a person's behavior on one network (say, among their professional associates) could be drastically different in another network (such as their network of relatives). In addition, the input networks in many real-world applications are often dynamic and heterogeneous with different types of nodes and edges, especially in the context of covert activities. With such variability, network alignment based on solely topological information is insufficient due to its inability to deal with the inherent node/edge ambiguities. To address this problem, the method according to embodiments of the present disclosure augments the alignment consistency principle to include both node and edge attributes, in addition to network topology. Specifically, the alignment problem described above is augmented to encode each of the consistency aspects and penalize any violation of the principles between matched entities. Consistency aspects refer to the corresponding nodes (across networks) that should be consistent in terms of its topology connection (to its neighbors) and node/edge attributes.

One of the benefits of the optimization-based alignment framework described herein is that it allows for flexible encoding of alignment conditions and criteria in a coherent, expandable manner. Specifically, these factors can be abstracted and progressively incorporated as different terms in a unified objective function, as shown in FIG. 7. The optimal node correspondence between networks can then be identified by minimizing the overall cost of the function. For instance, the table in FIG. 7 summarizes the high-level optimization functions of prior art alignment methods with different criterion/constraints. Different conditions and criteria can be encoded by introducing various terms into a cost function in a composite way, as illustrated in FIG. 7. Graph Merging is the process of finding the node correspondence. There are different ways to find the node correspondence. In one embodiment, the system described herein used the FINAL method (see Literature Reference No. 11).

In addition to the core topology consistency constraint $\mathcal{T}(A_1, A_2)$ (see Literature Reference No. 9 for topology consistency details), network alignment can be further enforced by 1) partially observed node correspondence constraint (see Literature Reference No. 10); 2) multiple graph interdependence constraint, where three or more networks are aligned (see Literature Reference No. 12 for details); and 3) attributed node and edge consistency constraint (see Literature Reference No. 11). In a high-level, node attributes can be one's age, income or other demographic information. Edge attributes can be different types of communications (e.g., phone, email, text). The partially observed node correspondence means that the correspondences for a subset of nodes (e.g., individual provide real name, other identifiable information in different networks) are known. The analysis indicates that in a large volume of the regularized parameter space, such a formulation is a well-conditioned convex optimization, which naturally leads to conjugate gradient descent type of algorithms to identify the optimal alignment.

(3.2.2) Network Embedding (Element 404)

Because of the massive quantity of data that will need to be integrated into the worldview, a key challenge is to make sure that the alignment framework will be able to scale up to the task. Embedding provides an alternative strategy to find the node correspondences across networks. A primary advantage of this alternative strategy is it's scalability (i.e., the ability to handle large networks). CANON (element 400) scales up the optimization-based network alignment framework by taking advantage of the intrinsic properties of input networks via low-rank approximation. Specifically, the system according to embodiments of the present disclosure approximates the adjacency matrices of the input networks via a rank-r eigen-value decomposition. Then the alignment method will perform an optimization that is based on the joint matrix composed of the approximated inputs.

Figure 8:
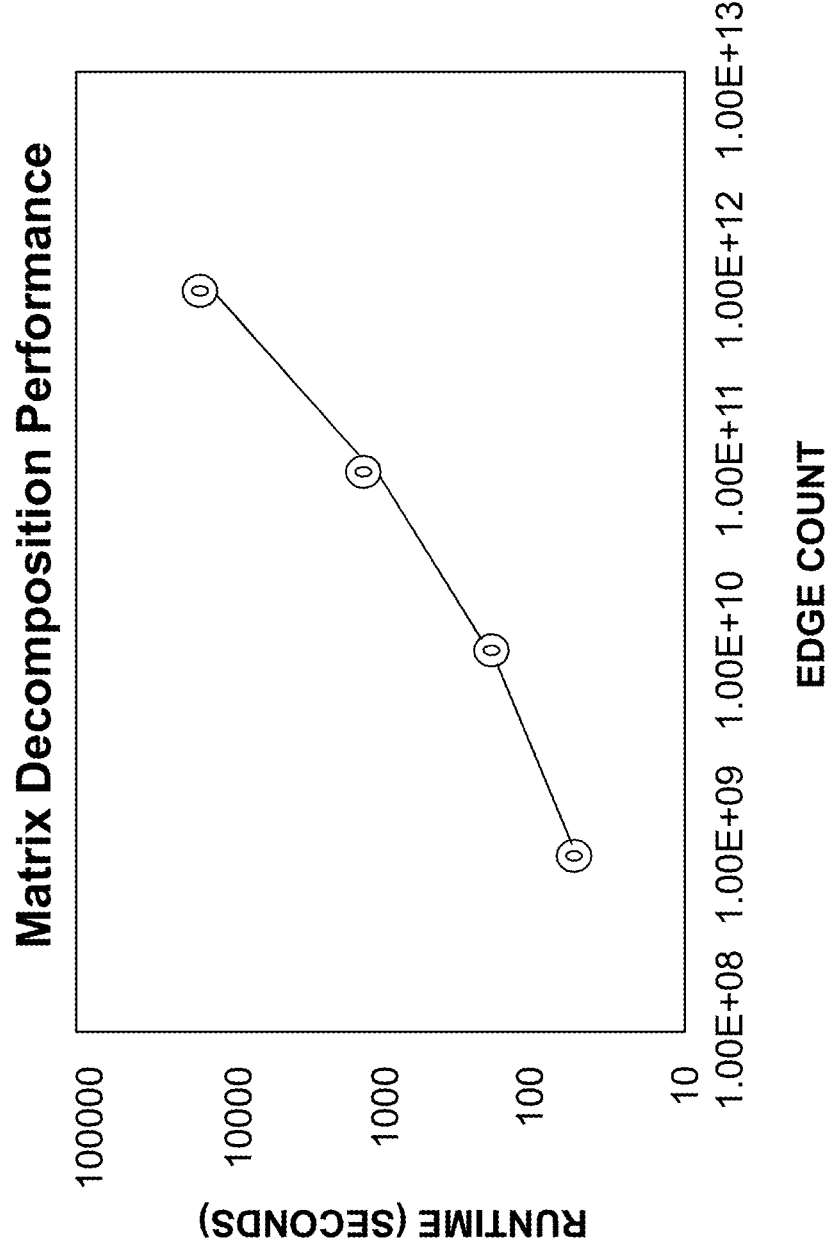
FIG. 8 is an illustration of using a distributed stochastic solver to achieve near linear scaling with edge count according to some embodiments of the present disclosure.

Within the alignment method, one challenge faced is due to the massive network sizes—over millions of nodes and in excess of billions of edges: computing the eigenvectors of the graph adjacency matrices is very intense (computationally). The sheer size of the input graphs makes it unlikely that they will fit into the memory of a single machine, thus it is crucial to utilize distributed and parallel computing frameworks that enable out-of-core, graph-based computation. To demonstrate the effectiveness of the mitigation strategy described herein for this bottleneck, a scalability pilot study was performed to evaluate the computation time of large-scale eigen-decompositions using a cluster hardware environment. This in-house cluster consists of 12 nodes, each with two 12-core Intel 2.5-GHz computer processing units (CPUs) and 128 gigabytes of RAM. A data-intensive, high-performance computing platform based on the Hadoop stack and comprised of HDFS, Hadoop YARN, Spark, and Mahout (see Literature Reference Nos. 7-11) was employed. This technology stack is a mature and ubiquitous open-source system that is an industry standard in the high-performance data-processing domain. Mahout sits at the top of this stack and is built to perform scalable machine-learning and data-mining operations. Within the Mahout framework, there is a suite of matrix decomposition algorithms and implementations optimized to run in a parallel environment (see Literature Reference No. 12). Using this commodity hardware cluster and open-source software, a rank-10 approximation of a 1,000,000 by 1,000,000 element matrix representing 1 trillion edges was decomposed and computed in 4.13 hours. The scalability of edge count for a given rank decomposition is near linear (i.e., scalable and efficient). As depicted in FIG. 8, using the distributed stochastic solver in Mahout, near linear scaling with edge count was achieved, supporting the conclusion that the method according to embodiments of the present disclosure will scale to real world sized problems with trillions of edges. The x-axis of the graph illustrated in FIG. 8 represents edge count, and the y-axis represents runtime in seconds. As the edge count increases, runtime also increases.

(3.2.3) Network Conditioning (Element 406)

It is well known that large sparse matrices are often ill-conditioned and cause spectral analysis such as eigenvalue computation to be numerically unstable.

Imagine a network is represented as an adjacency matrix, where rows and columns are persons. An entry in the adjacency matrix is 1 if two persons have communicated with each other, have had a financial transaction among each other, or have purchased things from each other. Since a person is likely to only interact with a few others, the adjacency matrix is overall very sparse. As stated above, it is well-known that it would cause issues. Thus, the techniques in CANON (element 400) are needed to handle these large sparse matrices. CANON (element 400) tackles the numerical instability issue using a multi-resolution, coarse-to-fine approach. The high-level idea is to first break down each input graph into communities, then conduct alignment at the community level, and, finally, align nodes within each community. A key aspect is to construct a transformed matrix B based on non-backtracking walk (see Literature Reference No. 13) as an intermediate step to identify the communities from input graphs. There are different methods to coarse-grain a graph into communities, the most common being spectral methods. Given an adjacency matrix A, a typical spectral algorithm assigns each node a k-dimensional vector according to its entries in the first k eigenvectors of A, and then cluster using, for example, the k-means algorithm. Such a method works well when the graph is sufficiently dense. In that case, the first eigenvector essentially sorts vertices based on their degree, and the second eigenvector is correlated with the communities. However, in the case when the graph is sparse, spectral methods tend to break down. This is primarily because the leading eigenvalues of A are dominated by the vertices of the highest degree, and their corresponding eigenvectors are localized around these vertices. As the number of nodes increase, these eigenvalues will swamp the community-correlated eigenvector with many uninformative eigenvectors. As a result, spectral algorithms based on the adjacency matrix of a sparse graph will fail to divide nodes into communities (see Literature Reference No. 14).

To address the aforementioned problem, a recent study showed that the performance of spectral algorithms can actually be preserved in sparse graphs using an alternative representation such as the non-backtracking matrix (see Literature Reference No. 13). This matrix represents a walk on the directed edges of the graph, with backtracking prohibited (i.e., do not proceed from a node u to a node v only to immediately return to node u). Formally, the non-backtracking matrix B is a 2m×2m matrix, where m is the number of edges in the sparse graph, defined by:

$$B_{(u \to v),(w \to x)} = \begin{cases} 1, & \text{if } v = w \text{ and } u \neq x \\ 0, & \text{otherwise.} \end{cases}$$

The spectrum of B has a nice property in that it is not sensitive to high-degree vertices. Subsequently, a good separation between uninformative eigenvectors and eigenvectors that are relevant to community structure can be maintained. In other words, spectral algorithms based on B will be able to identify communities successfully, even in sparse graphs.

Once the communities have been determined for each input graph, CANON (element 400) identifies the initial pairs of corresponding communities based on heuristics such as the sizes of the communities and partially observed node correspondence among communities. Within each pair of the communities, alignment can be conducted for individual nodes using methods described in previous section. One way to address the graph-alignment problem is to find the node correspondence in a low-dimensional latent space shared by the input networks. For simplicity, the approach developed in Literature Reference Nos. 16 and 17 was leveraged to compute the low-dimensional embedding from a joint matrix $L_Z$, which contains the Laplacians of two input graphs x and y. The joint Laplacian is defined as:

$$L_Z = \begin{bmatrix} L_{ll}^x + L_{ll}^y & L_{lu}^x & L_{lu}^y \\ L_{ul}^x & L_{uu}^x & 0 \\ L_{ul}^y & 0 & L_{uu}^y \end{bmatrix},$$

where l indicates labeled nodes with prior observed node correspondence, and u indicates nodes with unknown correspondence. The Laplacian matrix can be naturally restructured in multiple resolutions to reflect the matched communities (see Equation (1) below).

$$\hat{L}_Z = \begin{bmatrix} L_{ll}^{x1} + L_{ll}^{y1} & * & * & L_{lu}^{x1} & L_{lu}^{y1} & * & * & * \\ * & L_{ll}^{x2} + L_{ll}^{y2} & * & * & * & L_{lu}^{x2} & L_{lu}^{y2} & * \\ * & * & \ddots & * & * & * & * & * \\ L_{ul}^{x1} & * & * & L_{uu}^{x1} & 0 & * & * & * \\ L_{ul}^{y1} & * & * & 0 & L_{uu}^{y1} & * & * & * \\ * & L_{ul}^{x2} & * & * & * & L_{uu}^{x1} & 0 & * \\ * & L_{ul}^{y2} & * & * & * & 0 & L_{uu}^{y1} & * \\ * & * & * & * & * & * & * & \ddots \end{bmatrix} \quad (1)$$

The superscripts (e.g., $x_1$, $y_1$) indicate the matched communities, and the stars or asterisks represent sparse sub-matrices with only a few nonzero entries, which correspond to the intra-community connectivity. Note that an important preconditioning step is conducted between each pair of communities before constructing the full matrix $\widetilde{L_Z}$. Assuming the joint Laplacian of two communities is $L_g$, one can identify a good preconditioner $L_g^c$, which satisfies the approximation condition $(1-\in)L_g^c \preccurlyeq L_g \preccurlyeq (1+\in)L_g^c$ using the state-of-the-art ultra-sparsification method (see Literature Reference No. 15). $\in$ is a very small quantity; it intends to indicate a math condition and does not need to take a specific value. $\in$ is used to indicate an approximation condition that the approximation matrix should be close to the original matrix. The referenced approach ensures the $L_g^c$ matrix satisfies the condition. After that, the elements in $L_g^c$ can be put into $\widetilde{L_Z}$ according to the above arrangement, and then $\widetilde{L_Z}$ will be used to compute the latent space for node alignment by solving the standard eigen-decomposition problem. The method according to embodiments of the present disclosure effectively decomposes the original alignment problem using a multi-resolution technique in order to achieve numerical stability. The construction and decomposition of $\widetilde{L_Z}$ will also provide the benefit of permitting potential errors in the initial node assignment among communities. Finally, the preconditioning step for pairs of matched communities can be done in parallel, providing the added benefit of reduced computation time.

(3.3) Activity Detection (Element 306)

As illustrated in FIG. 4, the CANON (element 400) frameworks address Activity Detection (element 306) from two complementary directions (and modules). The first direction employs an attributed subgraph matching module (element 408), wherein a query graph (i.e., subgraph queries (element 418) describing a pathway template of a specific suspicious or delinquent activity is provided by the human analysts (element 416) (i.e., the end user). The algorithm's objective is to return a ranked list of matched subgraphs (element 412) of the worldview graph that most closely conform to the given query graph (subgraph queries (element 418)). The second direction is the investigative subgraph discovery module (element 410), which complements the subgraph matching problem by identifying anomalous subgraph structures in the worldview that may correspond to pathways of interest. These potentially significant subgraphs are flagged for subsequent investigation by an analyst. Together, the matching and discovery tools developed will provide a human analyst (element 416) with a sophisticated suite of algorithms capable of identifying (matching) subgraph instances embedded in a complex worldview graph that conforms to known adversarial activity pathways, as well as the ability to uncover (discover) unusual or suspicious worldview subgraphs that could potentially reveal hitherto unknown pathways.

Given a detected activity, there are multiple actions that can occur as a result of the detected activity. The output of the system described herein is a ranked list of suspicious individuals (nodes) and/or organizations (subgraphs) that participate in adversarial activities. The ranked list can be utilized in, for instance, alerting authorities (e.g., law enforcement agencies), increasing surveillance (i.e., increase number of cameras, increase number of watchers), public service announcements (e.g., AMBER alerts), and identifying networks of people working towards an illicit goal.

(3.3.1) Attributed Subgraph Matching (Element 408)

The goal of the subgraph matching problem is to identify contiguous segments of the worldview graph that conform to a given pathway graph. The sequence of actions are the activity pathways that are being identified (i.e., subgraph matching). For example, a given pathway graph can correspond to a recognizable signature of an upcoming terrorist attack. The approach described herein uses the formulation of the attributed subgraph matching problem which is defined as follows. Given an attributed worldview graph $G=(V, E, 1_E, 1_V)$ with node set V, edge set E, and functions $1_V: V \to \mathcal{A}_V^+$ and $1_E: V \times V \to \mathcal{A}_E^+$ that map nodes and edges to their respective sets of attributes, $\mathcal{A}_V$ and $\mathcal{A}_E$;; an attributed query graph $Q=(V', E', 1_{V'}, 1_{E'})$ representing a pathway of interest; and an integer $k>0$, find k distinct subgraphs of G that most closely match Q. Note that the setup allows a node v or edge (u, v) to be associated with sets of attributes (e.g., $1_V(v) \subseteq \mathcal{A}_V$ and $1_E(u, v) \subseteq \mathcal{A}_E$). Furthermore, wildcard attributes are supported by considering, for example, $1_V(v) = \mathcal{A}_V$. The attribute spaces themselves are not limited to being simple sets of labels; indeed, it will be possible to embed rich hierarchical and distance-based relationships between the attributes themselves, allowing for expressive scenarios to be encoded in both the worldview and query graph.

Figure 9:
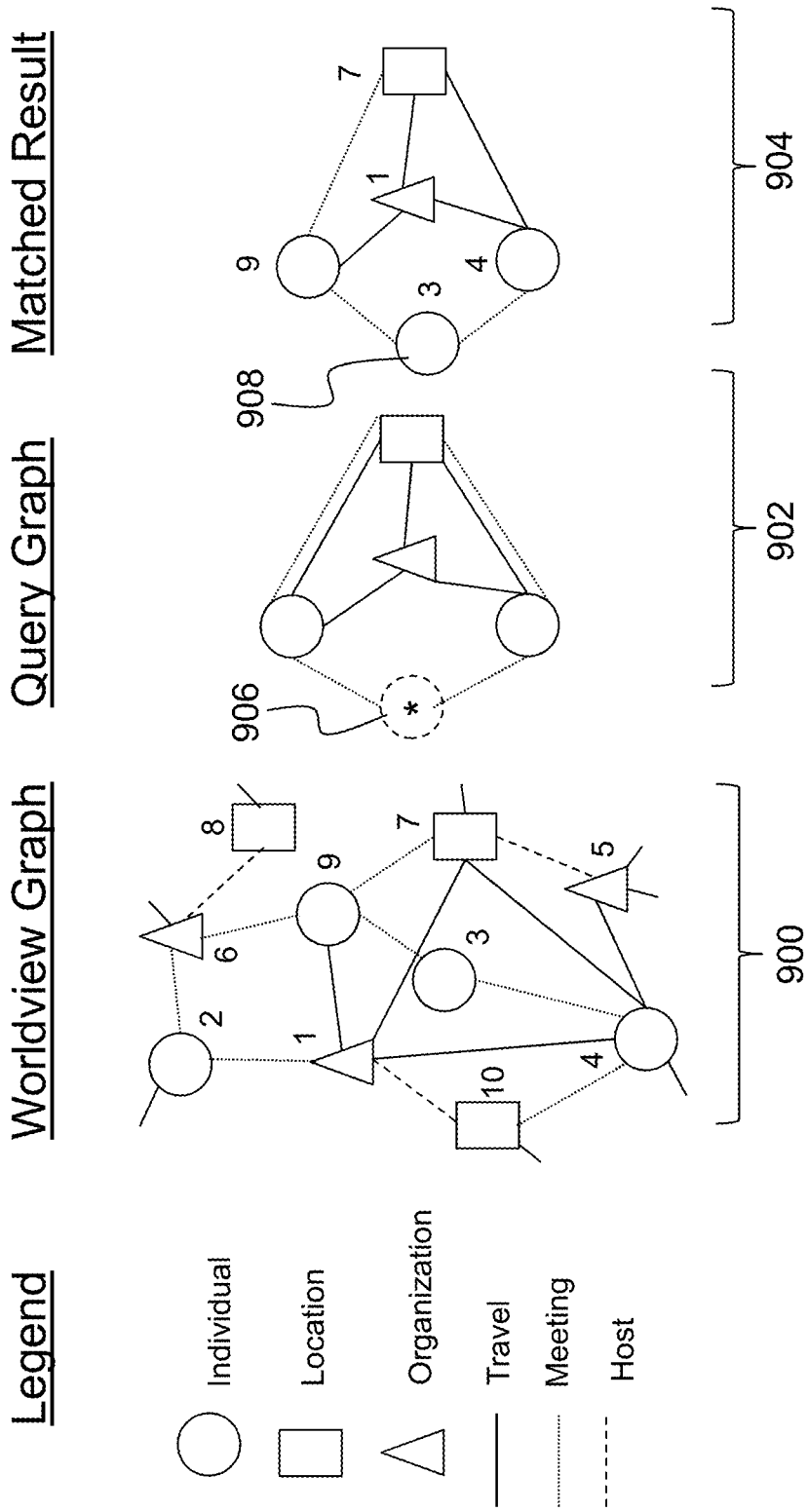
FIG. 9 is an illustration of an attributed worldview graph and a query graph according to some embodiments of the present disclosure.

FIG. 9 illustrates examples of a worldview graph (element 900), a query graph (element 902), and matched result (element 904). CANON (element 400) supports expressive queries over large, richly-attributed graphs. The query graph (element 902) includes a node with a wildcard attribute (element 906) depicted by a *), which is matched with a node with the "Individual" attribute (element 908) in the matched result (element 904) of the query. In summary, this formulation provides several key benefits, such as a goodness of fit measure to evaluate the quality of an approximate match; dynamic and temporal matching to identify structural-temporal matches instead of the ability to encode distance metrics and hierarchical relationships between the individual node and edge attributes; and incremental matching that will enable responsive user interaction with fast computation of perturbed queries.

With respect to evaluating the quality of a candidate subgraph match (element 904), the approach according to embodiments of the present disclosure extends prior work using proximity-based measures (see Literature Reference Nos. 18 and 19). In order to evaluate the fit of a pair of nodes u, v E V in the worldview graph G (element 900) to a pair of adjacent nodes u', v'∈E' in the query graph Q (element 902) this technique uses a measure that is generated using a Random Walk with Restart (RWR) and is proportional to the extent that the random walker moves from u to v along a path of one or more edges in G. The RWR method takes into consideration the different node and edge attributes when computing the similarity scores to maximize continuity between template and subgraph attributes.

Figure 10:
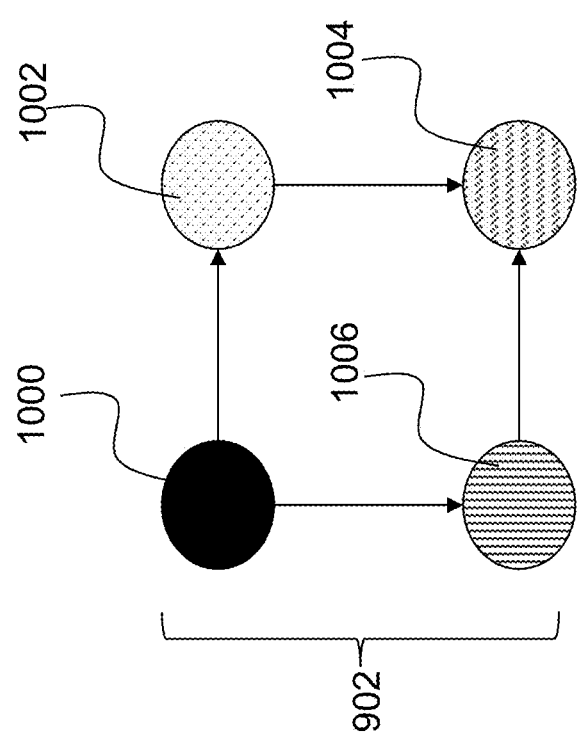
FIG. 10 is an illustration of temporal dependencies in a query graph according to some embodiments of the present disclosure.

Continuing with FIG. 9, CANON (element 400) extends the traditional subgraph matching formalism into the dynamic and temporal regime with two innovations. First, as the underlying worldview graph (element 900) changes over time, the goal is to quickly update the search (matched) results (element 904) to reflect these changes. This involves designing a computational pipeline that makes full use of memoization strategies—judiciously storing and reusing the results of intermediate computations in order to quickly re-evaluate a match after the network changes to reduce redundant computing and improve efficiency. The next innovation is a temporal extension that involves the handling of time-dependent activities and events encoded into the query pathway graphs. The approach described herein addresses this by infusing the fit measure with additional criterion that penalizes candidate subgraph matches that deviate from the temporal sequencing encoded in the query graph (element 902). Leveraging the expressiveness afforded by the node and edge attributes, the system described herein will be able to encode rich temporal dependencies in a query graph (element 902), allowing for the presence of both time-dependent and time-independent elements within a single query. For example, this capability will allow expression of queries as follows. Consider the query graph (element 902) in FIG. 10 and suppose that it is required that the link between the solid node (element 1000) and the dotted node (element 1002) appears before the link between the dotted node (element 1002) and the horizontal striped node (element 1004); and that the link between the solid node (element 1000) and the vertical striped node (element 1006) appears before the link between the vertical striped node (element 1006) and the horizontal striped node (element 1004). Furthermore, there is no requirement on the temporal relationship between, for example, the edge connecting the solid node (element 1000) and the dotted node (element 1002) and the edge connecting the solid node (element 1000) and the vertical striped node (element 1006). This kind of temporal modeling will enable complex queries that capture higher-level relationships between multiple interrelated sequences of events. FIG. 10 illustrates how the approach will enable rich temporal dependencies in a query graph (element 902), allowing for the presence of both time-dependent and time-independent elements within a single query.

Finally, the CANON (element 400) framework features incremental subgraph matching to allow a user to iteratively formulate and modify a query graph. This functionality will be made possible by combining computationally efficient algorithms with effective memoization schemes, which will leverage the previously discussed machinery enabling the system to handle dynamic changes in the worldview graph. Fundamentally, the functionality developed to handle perturbations in the worldview graph (element 900) will also be used to manage perturbations in the query graphs (element 902).

(3.3.2) Investigative Subgraph Discovery (Element 410)

The goal of the investigative subgraph discovery module (element 410, FIGS. 4 and 23) is to expedite the identification of relevant entities embedded in the large worldview graph (element 900) which could belong to complex patterns of interest. Subgraph discovery (element 410) intends to complement subgraph detection by providing the capability to pose query graphs (element 902) to the worldview graph (element 900) at a higher level of abstraction than a subgraph, such as an embedding of topological features and attribute distributions; or by specifying no query at all, the system will discover atypical subgraphs more generally. To support this functionality, the framework exploits recent advances in spectral analysis and rare category detection to identify instances of unusual subgraphs that deviate from typical patterns or behaviors by means of collective probabilistic inference over multiple input subgraphs. The main advantage of this approach is its ability to extract and aggregate the rare, low-footprint signals that are relevant to rare complex events, while excluding irrelevant signals. More specifically, the approach involves the following steps. First, for each entity/node (e.g., a person that participated in the targeted activity), a local algorithm is used to estimate the probability of belonging to a complex event of interest, taking into consideration non-local properties of the world-view graph (element 900). Such a hierarchical approach allows one to explicitly estimate the relationship among different aspects and regions of the worldview graph (element 900) and naturally encode prior domain knowledge via appropriate priors (e.g., Dirichlet or matrix stick-breaking processes). Furthermore, the method automatically teases out the irrelevant worldview aspects and subgraphs by aggregating the aspect- and subgraph-specific probabilities in a robust manner.

(3.4) Experimental Studies

In experimental studies, the method described herein was used to detect instances of data points in a minority class in a synthetic dataset where the distribution of examples across the classes (e.g., majority class, minority class) is not equal. In the studies, the majority class had many data points, while the minority class had few data points. The minority class is harder to predict because there are few examples of this class in the dataset. It is more challenging for a model to learn the characteristics of examples from the minority class, and to differentiate examples from this class from the majority class.

Figures 11A, 11B:
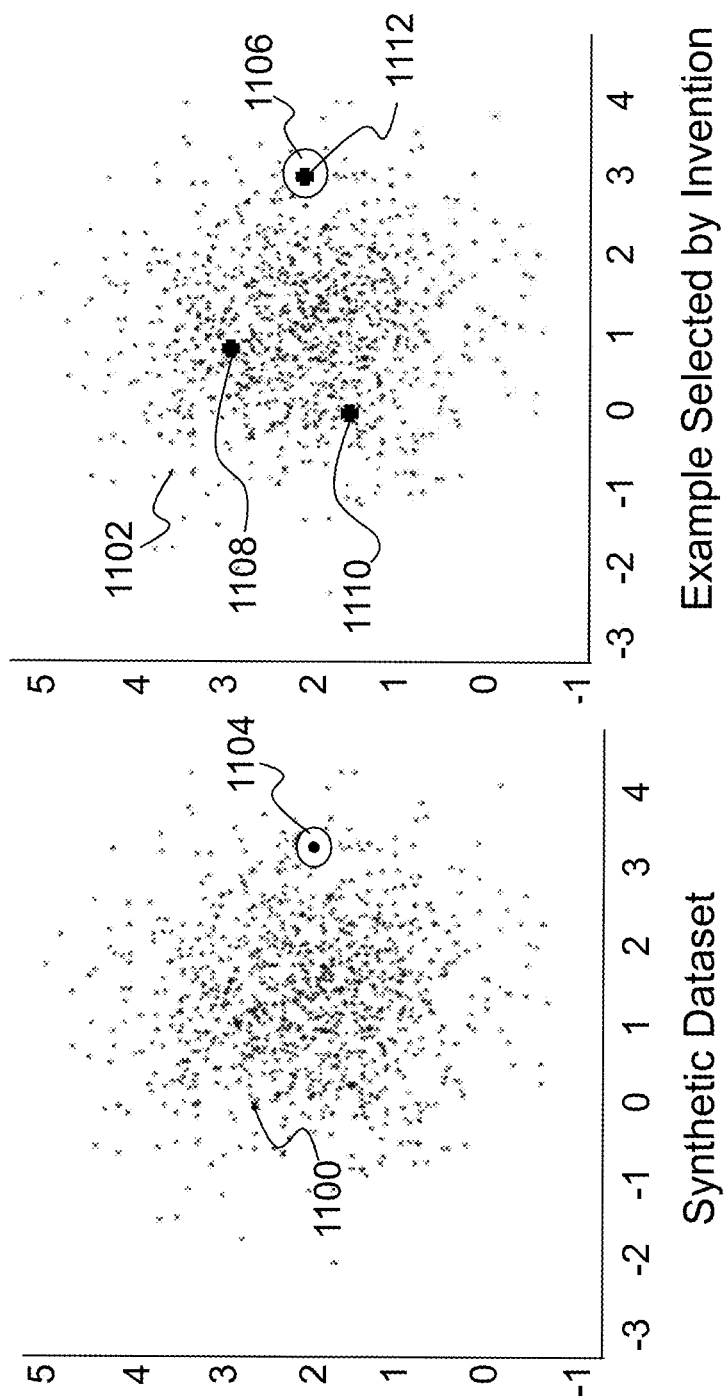
FIG. 11A is an illustration of finding atypical data instances in a synthetic dataset according to some embodiments of the present disclosure.
FIG. 11B is an illustration of finding atypical data instances in an example dataset selected according to some embodiments of the present disclosure.

To address the challenge, an algorithm was developed for discovering rare instances of minority classes in a challenging, non-separable scenario with a strong theoretic lower-bound on the probability of detection. The approach is based on an unsupervised local-density-differential sampling strategy that iteratively grows a region around each sample point, measuring the local density as the region expands. At each step, the point with the largest change in local density is selected and its class label is determined via an oracle query. The process halts once an element from every class has been identified. Given some smoothness assumptions on the majority class and the compactness of the minority classes, the algorithm will select at least one point whose probability of coming from a minority class is at least 1/3. FIGS. 11A and 11B depict examples of finding atypical data instances. Grey and black points (e.g., elements 1100 and 1102) are from the majority class, and white points (e.g., element 1104 and 1106) are from the minority class. The three plus signs (elements 1108, 1110, and 1112) represent data points selected by the method according to the invention. FIG. 11A demonstrates the point selections for a synthetic data set consisting of 1000 majority class points and only 10 minority class points. As FIG. 11B shows, the approach according to embodiments of the present disclosure only needs to select three points (elements 1108, 1110, and 1112) before correctly identifying one belonging to the minority class, providing a substantial 33X improvement compared to random selection.

An embodiment of this invention was produced by implementing the technical modules contained in the two technical components (Graph Merging (element 304), Activity Detection (element 306)). To demonstrate the effectiveness of the system described herein, experimental results obtained in the two components are described below. For Graph Merging (element 304), pairwise network alignment experiments were conducted on 12 synthesized datasets (denoted as B0~B11). These datasets were created to model real-world activities on acquiring, fabricating, proliferating, and/or deploying weapons of mass terrorism (WMT). In each dataset, a pair of simulated communication networks with 10,000 (10 k) nodes is given. The goal is to identify the node correspondence. The optimization-based approach according to embodiments of the present disclosure takes into account both network topology structure and attribute information associated with nodes. The table in FIG. 12 shows network alignment results obtained using the optimization-based approach, leveraging both network topology and node attribute information. Specifically, the table shows the overall accuracies in finding node correspondence across networks. Highly accurate network alignment results (up to 97.47% accuracy) between each pair of networks was obtained. Note that each pair of networks has less than 10% overlapping edges. These results suggest that the approach described herein is highly effective in 'stitching' the nodes together across different networks, despite little shared network structures. This provides great benefits in forming an accurate worldview network from multi-sourced networks for modeling adversarial activities.

Once the worldview graph is constructed, the second set of experiments relates to Activity Detection (element 306). For this experiment, the goal was to demonstrate CANON's (element 400) capability in identifying suspicious subgraph regions that are related to WMT activities. Here, a synthetic dataset containing 10 worldview networks/graphs was utilized. For each network, a subgraph representing a target WMT pathway/template (element 308) is embedded within. The objective of the experiment is to identify all the nodes contained in the subgraph. The table in FIG. 13 shows the detailed nDCG (normalized discounted cumulative gain), AP (average precision), and AUROC (area under the receiver operating characteristics) scores for the subgraph discovery results on the ten different networks (numbered 1 through 10). As can be observed, the results suggest that the Activity Detection (element 306) component is effective in separating WMT-related subgraphs from the background networks based on a near perfect discovery rate. Perfect (or near perfect) discovery rates (i.e., 100% or close to 100%) were obtained for networks 6, 8, and 9. The combination of Graph Merging (element 304) and Activity Detection (element 306) components in the CANON (element 400) framework provides an integrated analysis environment for modeling WMT activities, and the framework is applicable to modeling any adversarial activities in general.

(3.4.1) VAST Challenge 2018 (Mini-Challenge 3)

The VAST challenge is a public data challenge found at vacommunity.org/VAST+Challenge+2018+MC3. The following illustrates how the system described herein can deliver actionable information to identify and attribute the source of illicit activities. The "Overview" provides a background of the challenge scenario. The "Insider Letter" and "Backgrounder on Kasios International Data" are the initial information for investigator/analysts to investigate illicit activities; however, it would be too laborious, time-consuming, and close to impossible to go over all transactional data to identify illicit activities.

From VAST: "Overview: Mistford is a mid-size city located to the southwest of the Boonsong Lekagul Wildlife Preserve. The city has a small industrial area with four light-manufacturing endeavors. Mistford and the wildlife preserve are struggling with the possible endangerment of the Rose-Crested Blue Pipit, a locally loved bird. The bird's nesting pairs seem to have decreased alarmingly, prompting an investigation last year implicating Kasios Office Furniture, a Mistford manufacturing firm. Since the initial investigation, the situation has evolved: Kasios insists that they have done nothing wrong! They assert that grad student Mitch Vogel and his professors are mere media-seekers trying to draw attention away from their lackadaisical research. Kasios presents itself as an extremely eco-friendly organization. They have launched their own very public investigation into the issues raised last year and are reporting very different results! It's time to apply your visual analytics expertise to help illuminate the path to good science."

From VAST: Challenge: "An unexpected source suggests extent of the Kasios' involvement in illicit activities may be much broader than just Mistford and the Wildlife Preserve." The objective is to identify the broader scope of illicit activities and provide actionable intelligence to law enforcement.

From VAST: "Insider Letter to Mr. Vogel"

"Dear Mr. Vogel,

I have been told by a friend about your efforts to protect the Rose-Crested Blue Pipit. As a fellow bird lover I am inspired by your work. For the past 5 years I have been working for Kasios International. I took the job because I heard that Kasios was a responsible company. I was disappointed to learn that our environmental record is not as clean as it appears. Most people here want to do the right thing but a few people are just interested in protecting company profits. I have even heard rumors of a group within Kasios that is planning to restart production of some banned solvent. I want to help you. I've been collecting information on who's involved in this scheme. I've got a collection of phone, email, meeting, and purchase records for the entire company. It's not everything, but I hope you can still use it. Don't ask me where I got this data—I could lose my job! I've also collected some information on a group of people that I think are involved. I've got a list of names and some of their records. I think this group might be connected to a purchase of some chemicals. The data has had the names stripped off because that's how we store it but I also got a company directory that you can use. If you can put the directory and the other records together you might be able to figure out who's behind this.

A Friend of the Pipit

Here's the group I think is involved:

Alex Hall, Lizbeth Jindra, Patrick Lane, Richard Fox, Sara Ballard, May Burton, Glen Grant, Dylan Ballard, Meryl Pastuch, Melita Scarpaci, Augusta Sharp, Kerstin Belveal, Rosalia Larroque, Lindsy Henion, Julie Tierno, Jose Ringwald, Ramiro Gault, Tobi Gatlin, Refugio Orrantia, and Jenice Savaria."

From VAST: "Backgrounder on Kasios International Data"

The Kasios Insider has provided data from across the company. There are call records, emails, purchases, and meetings. The data only includes the source of each transaction, the recipient (destination), and the time of the transaction. Contents of emails or phone calls are not available. All of the provided data files have the same format. The data are provided in comma-separated format with four columns:

1. Source (contains the company ID # for the person who called, sent an email, purchased something, or invited people to a meeting)

2. Etype (contains a number designating what kind of connection is made)

a. 0 is for calls
   b. 1 is for emails
   c. 2 is for purchases
   d. 3 is for meetings 3. Destination (contains company ID # for the person who is receiving a call, receiving an email, selling something to a buyer, or being invited to a meeting).

4. Time stamp—in seconds starting on May 11, 2015 at 14:00.

There is a company index that shows the name of everyone in the company and their associated ID #. There are 642,631 individuals in the index.

There are four data files that cover the whole company:
calls.csv has information on 10.6 million calls (251 MB uncompressed)
emails.csv has information on 14.6 million emails (345 MB uncompressed)
purchases.csv has information on 762 thousand purchases (18.8 MB uncompressed)
meetings.csv has information on 127 thousand meetings (3.26 MB uncompressed)

There are four data files that contain information about individuals that the Insider has indicated as suspicious:
Suspicious_calls.csv (1.76 KB uncompressed)
Suspicious_emails.csv (1.55 KB uncompressed)
Suspicious_purchases.csv (27 B uncompressed)
Suspicious_meetings.csv (130 B uncompressed)

For question 4, there is a file that contains a list of 4 individuals who made 7 suspicious purchases, who may be of interest.

Other_suspicious_purchases.csv (378 B uncompressed)

Analysts pose the following questions and the system described herein generates answers:

Q1: Identify the common nodes across the different channel graphs without using node IDs. (nodes are actors—people or organization)

Q2: What can you say about the fictional company overall from their activity graphs?

Q3: A partial signal is provided. Can you find other individuals that are connected and assess the likelihood that they are involved in the plot?

Q4: Reverse engineer a template for the organizational structure of the signal. How does it change over time?

Q5: Use the signal from Q3 and template from Q4 to search for other similar groups in the large graph, even better if you can find groups that haven't been indicated by the insider or find the indicated groups without using the cues. Are there other groups that are starting up but haven't executed their plans?

Answer to Question 1:

To approach the network alignment problem, first graphs are constructed for each channel, where edges are constructed by aggregating pairwise node interactions over time. Preliminary experiments quickly suggested that networks across channels do not maintain topological consistency. The table in FIG. 14 details the amount of overlapping edges between different pairs of channels. In many instances, there is almost no shared edges between two distinct channels. Based on the statistics of FIG. 14, the focus is on the call and email networks for this question.

Figure 15B:
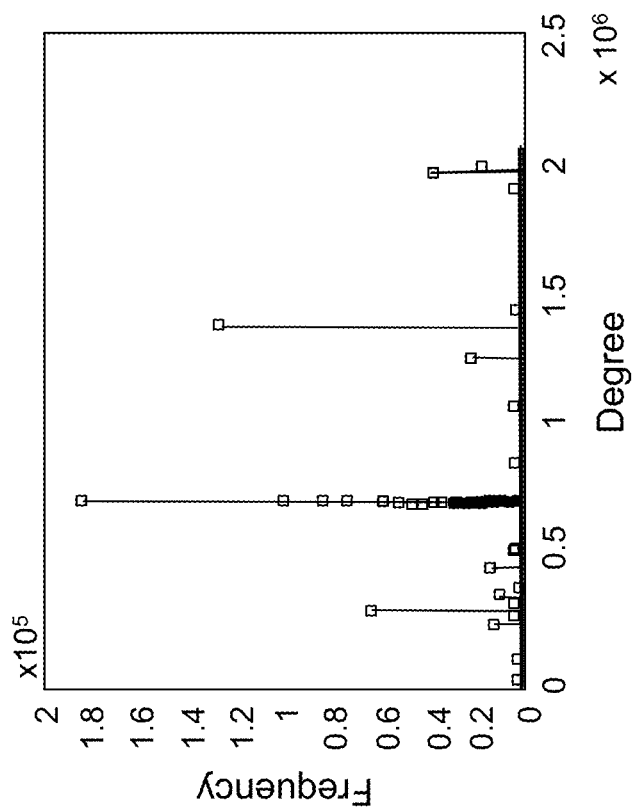
FIG. 15B is an illustration of degree distribution of the email network according to some embodiments of the present disclosure.
Figure 15A:
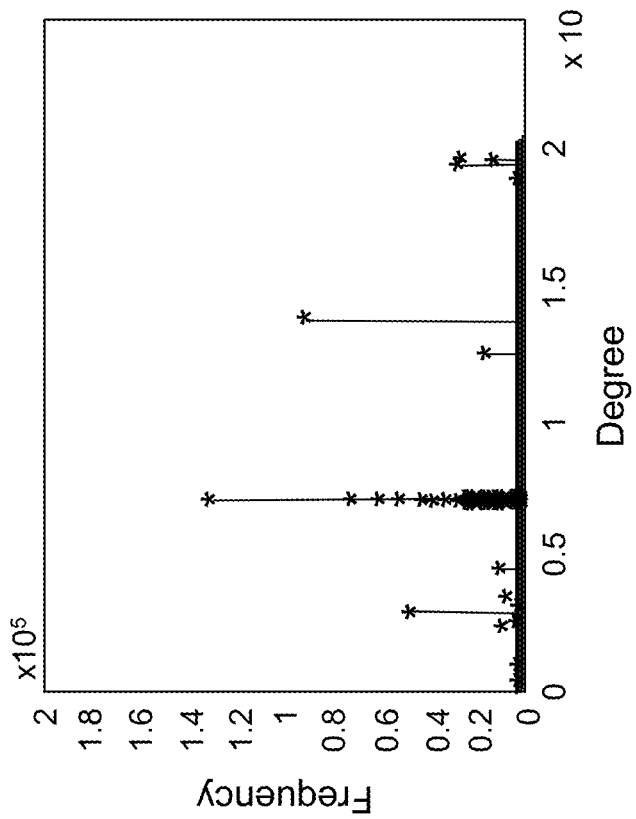
FIG. 15A is an illustration of degree distribution of the call network according to some embodiments of the present disclosure.
Figures 16A, 16B, 16C:
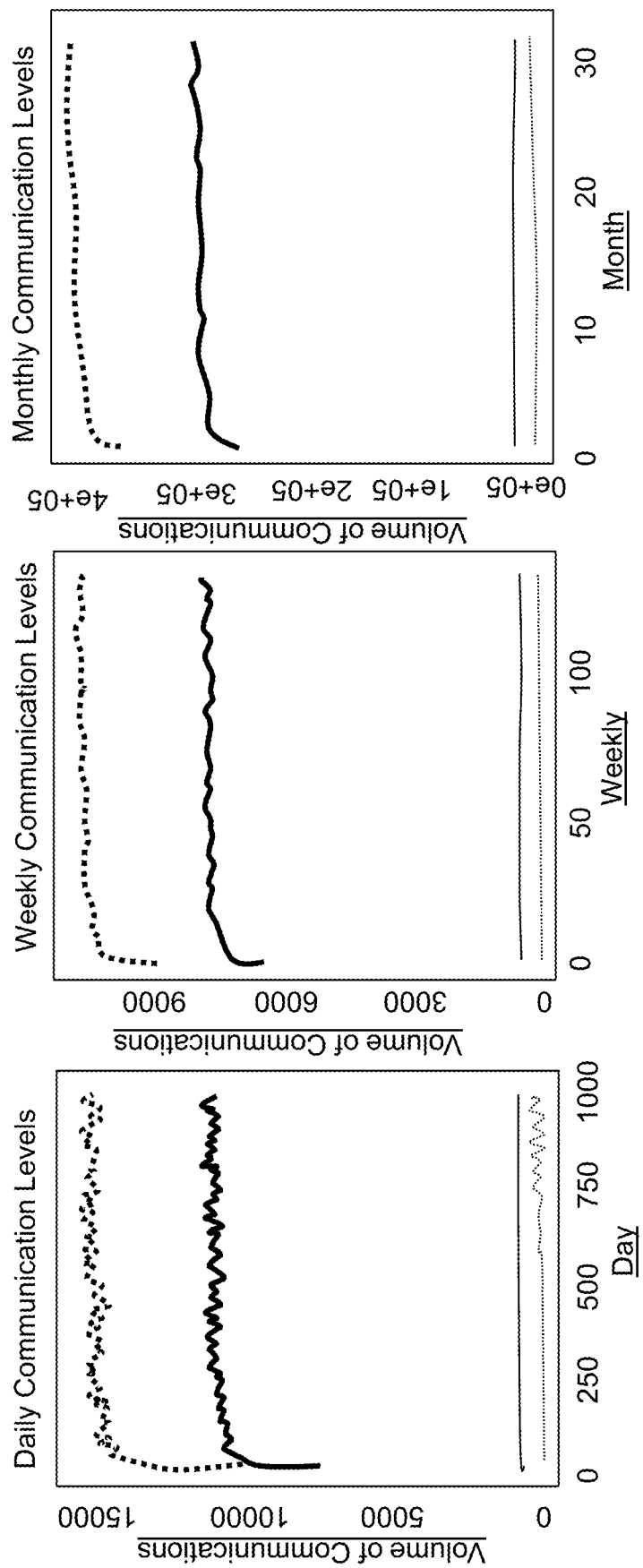
FIG. 16A is an illustration of communication patterns across different channels in daily communication levels according to some embodiments of the present disclosure.
FIG. 16B is an illustration of communication patterns across different channels in weekly communication levels according to some embodiments of the present disclosure.
FIG. 16C is an illustration of communication patterns across different in monthly communication levels according to some embodiments of the present disclosure.
Figure 17:
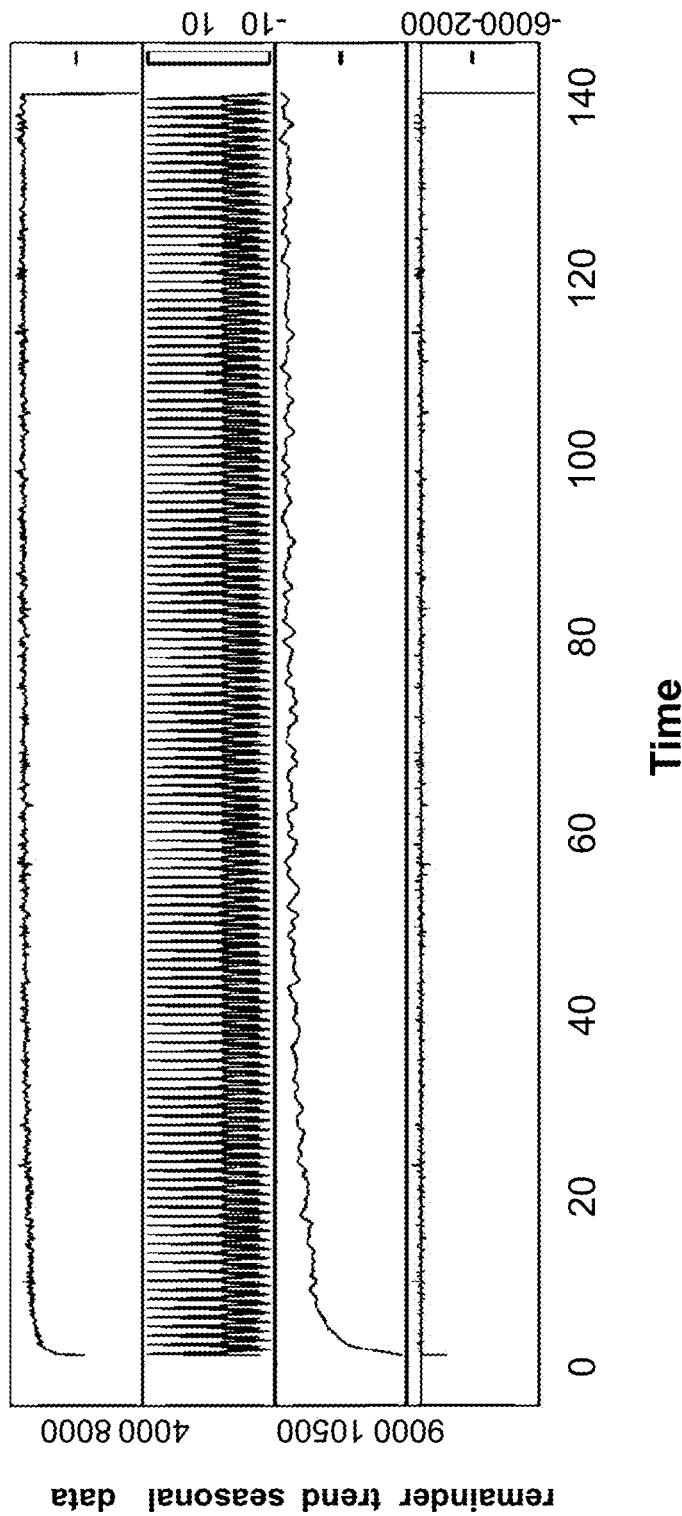
FIG. 17 is an illustration of extraction of periodic trends in daily call volumes according to some embodiments of the present disclosure.
Figure 19A:
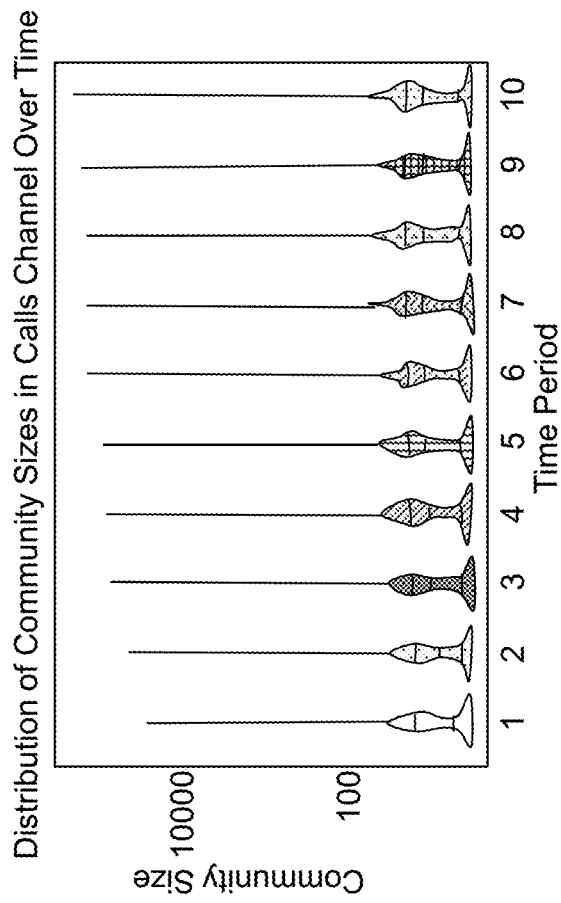
FIG. 19 is an illustration of violin plots showing the community size distribution for the call and email networks according to some embodiments of the present disclosure.
Figure 19B:
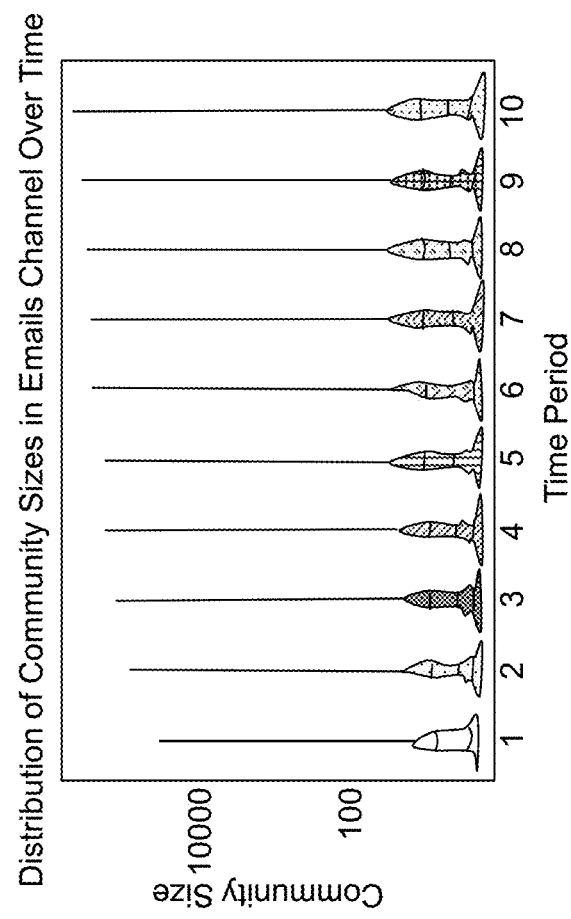

To address this problem, the heuristics derived from high-degree network nodes were leveraged, as they seem to be consistent across both call networks and email networks. FIGS. 15A and 15B depict the degree distribution of the call and email networks ordered by node Ds, respectively. The degree of a node in a network is the number of connections it has to other nodes, and the degree distribution is the probability distribution of these degrees over the whole network. Based on the degree similarity, one could perfectly align 21 nodes with degree higher than 2e+4 between the call and email networks. Subsequently, the subgraphs induced by the 1-hop neighborhood of these nodes were extracted, which contain ~30 k and ~40 k nodes, respectively.

Finally, the FINAL-P algorithm in CANON was run between the two subgraphs using the 21 nodes as the prior. However, only an additional 30 more nodes were able to be correctly aligned. The FINAL-N algorithm (leveraging node attributes) was also tested by incorporating activity time series for each node as their feature attributes. However, the gain in network alignment accuracy was minimal. FINAL-P and FINAL-N are two variants of the FINAL method, which were both implemented in the CANON system. FINAL-P utilized network topology information only, while FINAL-N also leveraged attribute information.

Answer to Question 3:

The TA3 spectral discovery algorithm according to embodiments of the present disclosure was extended for this question. Specifically, let A be adjacency matrix of communication between the employees. Define a background matrix as $$B = \frac{dd^T}{\Sigma d},$$

where d is a degree vector. Intuitively $B_{i,j}$ is an expected number of edges between nodes i and j in the Chung-Lu model. A residual matrix can further be defined as C=A−B.

In the original subgraph discovery algorithm, the aim is to find a subset of nodes that are heavily connected to each other (i.e., their connectivity is greater than expected connectivity in the background). This can be done by finding the principal eigenvectors of C with small L1-norm. Given the partial signals, the algorithm can be modified using an iterative procedure based on the provided suspicious nodes. Specifically, first define a vector x, where each element $x_i$ is set to 1 if i is in the set of suspicious nodes S, and 0 otherwise. Based on the vector, calculate y=Cx, and identify a set of suspicious nodes based on the highest y values. Then, update x with they value and iterate this process until it converges. Starting with the set of 20 given suspicious nodes (i.e., nodes contained in the 'Suspicious_*.csv' files), the algorithm converged after just one iteration to a set of 25 nodes. The set of node consists of the 20 original nodes and 5 newly found suspicious nodes. These additional nodes (in the order of confidence) are:

981554 175354 2037156 944354 786361.

To further verify the results, another approach was developed to identify the additional signal nodes based on Bayesian analysis. For a given set of nodes S and a given node i, the likelihood of a hypothesis that a node i belongs to the community S was estimated. The number of connections c between i and S was calculated, and then the probability of the fact that a node i has at least c connections with S under the null hypothesis (which is the Chung-Lu model (see Literature Reference No. 20)) was calculated. If this probability is very low, then it is assumed that the corresponding node belongs to the same (suspect) group. Based on this method, the result was the same set of 25 suspicious nodes as in the aforementioned method. Thus, there is fair confidence on the 5 discovered nodes.

Figure 20:
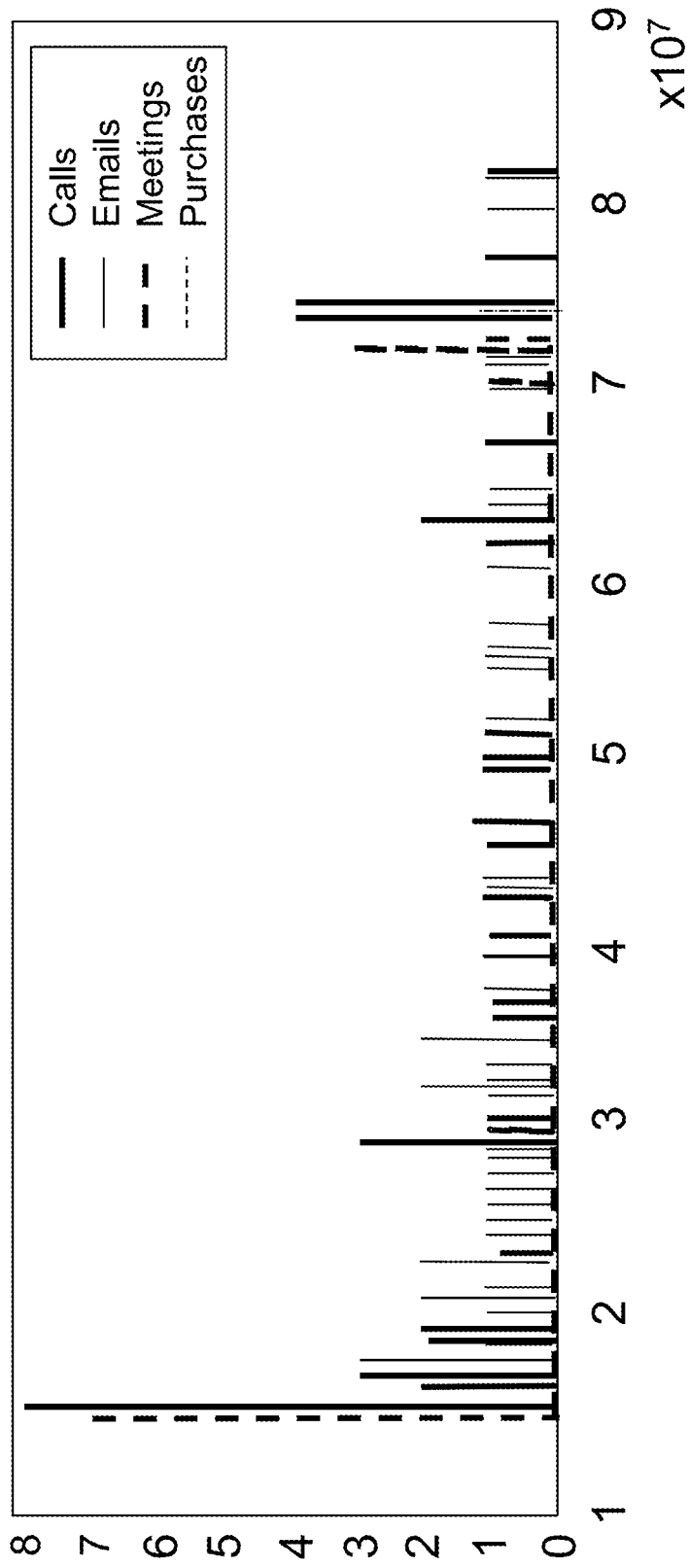
FIG. 20 is a histogram illustrating suspicious event occurrences from four communication channels according to some embodiments of the present disclosure.
Figure 21B:
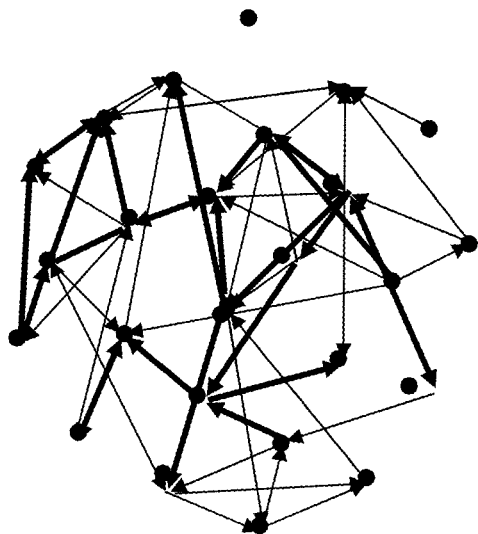
FIG. 21B is an illustration of activity patterns of four communication channels at a second time period according to some embodiments of the present disclosure.
Figure 21D:
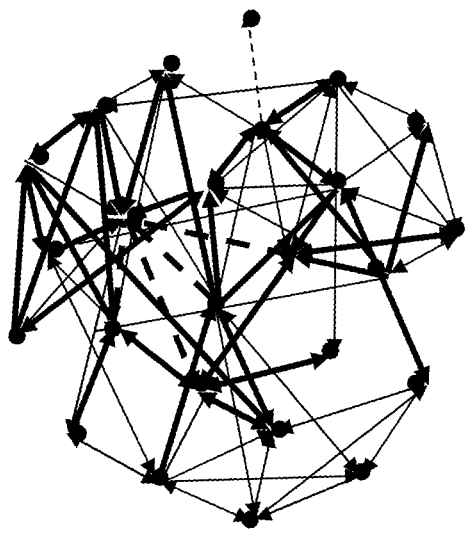
FIG. 21D is an illustration of a full activity template according to some embodiments of the present disclosure.
Figure 21A:
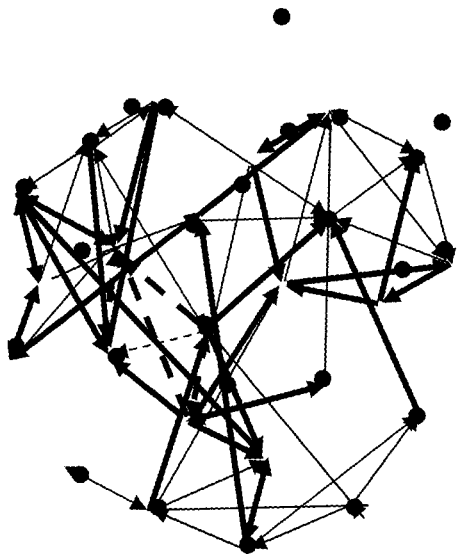
FIG. 21A is an illustration of activity patterns of four communication channels at a first time period according to some embodiments of the present disclosure.
Figure 21C:
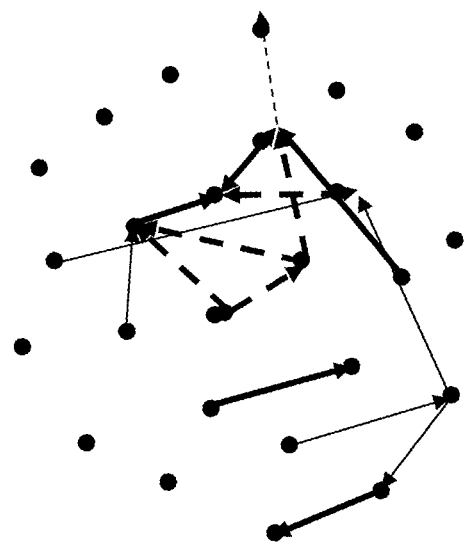
FIG. 21C is an illustration of activity patterns of four communication channels at a third time period according to some embodiments of the present disclosure.

Answer to Question 4:

FIG. 20 shows a histogram of the activities occurring within the 25 suspicious nodes. One can observe that call and email activities happen regularly and appear to be much more frequent than the others. There is a single purchase activity, and meeting activities happen only at the beginning of the time window and immediately before the purchase activity. FIGS. 21A-21D show the activity patterns of the subgraph consisting of the 25 nodes. It was observed that there was an initial flurry of calls, emails, and meetings in the first quarter with respect to the whole time period of suspicious activity (FIG. 21A). In the subsequent year and a half, the total call and email activity level was similar to that seen in the first quarter. No meetings were held during this entire period (FIG. 21B). In the final quarter, call and email activity progressed at the same reduced pace as the past year and a half, but five meetings occurred during this quarter and the suspicious purchase was made shortly after the meetings (FIG. 21C). FIG. 21D depicts a full activity template.

Answer to Question 5:

It was observed that the signal recovered in Q3 is highly connected; thus, it is believed that it is possible to recover the full signal with much fewer or even a single suspicious transaction. To test this hypothesis, the iterative discovery algorithm (described in Q3) was re-run with only two nodes that are involved in a single suspicious purchase defined in 'Suspicious_purchases.csv':
1847246, 2, 2038003, 74565933.
The result is indeed very promising; the same 25 nodes were recovered as before with 20 given suspicious nodes. This means that even if there is not a list of suspicious emails, calls and meetings, it is still possible to recover the entire signal solely from one suspicious purchase. Based on the four buyer-seller purchasing pairs provided in 'Other_suspicious_purchases.csv', a possible group of 30+ nodes (i.e., people) was identified for each pair as the potential suspicious group. Next, it was determined that it is possible to find suspicious groups that haven't been indicated by the insider or find the indicated groups without using the cues with the unsupervised spectral analysis algorithm. In each iteration, a suspicious group of nodes will be identified and subsequently removed from the network. The algorithm then repeats and finds another suspicious group in the next iteration. The system and method described herein was able to obtain the suspicious group from the question 3 without any cue (not even suspicious purchase) (see answer #2). The system and method is also able to find two of the four suspicious purchases from the above question (answer #3 and #5 correspond to the groups obtained from the third and the second suspicious buyer-seller pairs). In addition, four more suspicious groups (answer #1, #4, #6, #7) were found.

As described above, a suspicious activity typically ends with a purchase. However, the spectral analysis method does not detect purchase activities (i.e., involving seller nodes) in most cases. This is because a seller usually engages in one or two activities with members of the group (i.e., weak connectivity to the group). To mitigate this problem, all purchases that are made by members of the suspicious group were first enumerated. Subsequently, the suspicious purchase was identified based on heuristics, such as the number of transactions the seller makes with the group and the relative time of purchase with respect to the other activities inside the group. Finally, a suspicious group (answer #7) there wasn't linked to any appropriate purchase activities was also discovered. It is possible that this group corresponds to a plot that haven't finished.

Figure 22B:
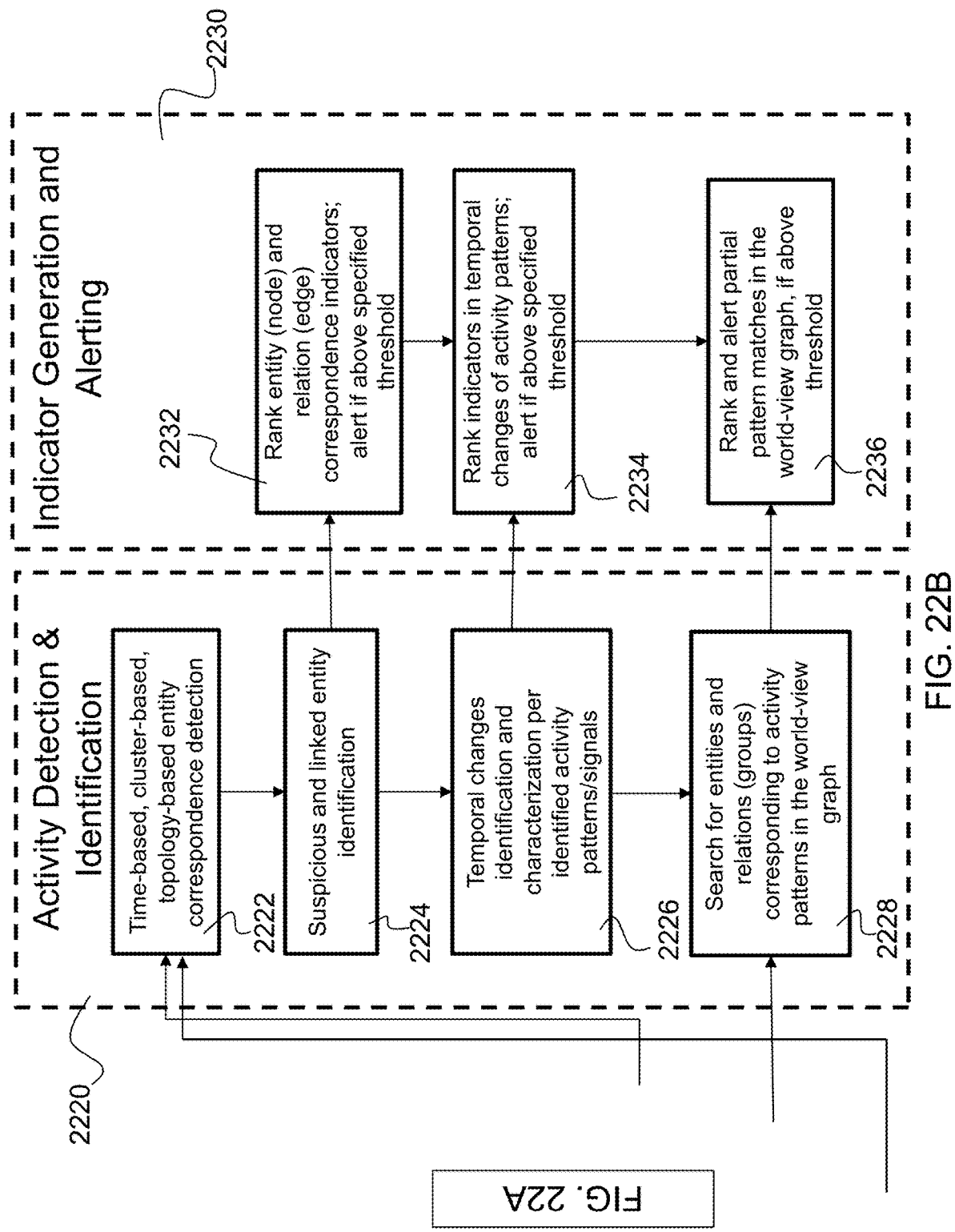
FIG. 22B is an illustration of an Activity Detection and identification module and an indicator generation and alerting module of the system for modeling adversarial activities according to some embodiments of the present disclosure.

FIGS. 22A and 22B illustrate a flow diagram detailing a system and method of for modeling adversarial activities according to embodiments of the present disclosure. FIGS. 22A and 22B illustrate how the VAST challenge questions are answered progressively using the CANON components according to embodiments of the present disclosure. As shown in FIG. 22A, input data (element 2200), which can comprise transactional data (element 2202), background and seeding information (element 2204), and questions and activity templates (element 2206). Transaction data (element 2202) includes heterogeneous multi-source transaction data, such as emails between parties, calls between parties, meetings between parties, and purchases from one party by another. Non-limiting examples of background and seeding information (element 2204) include aligned entities across multisource data and suspicious entities. Non-limiting examples of questions and activity templates (element 2206) include common nodes across channels and activity pathways.

Input data (element 2200) is processed by a graph processing module (element 2208). First, a graph is constructed for each transactional data source/channel (e.g., nodes, entities, edges, relations) (element 2210). The system then labels and instantiates seed information on channel graphs (element 2212). Next, entities (nodes) and relations (edges) are aligned across multiple channel graphs (element 2214). These graphs are merged with the world-view graph (element 2216), resulting in an updated world-view graph (element 2218).

As shown in FIG. 22B, an activity detection and identification module (element 2220) performs time-based, cluster-based, topology-based entity correspondence detection (element 2222). Next, suspicious and linked entity identification (element 2224) is performed. Then the system performs temporal changes identification and characterization per identified activity patterns/signal (element 2226). A search for entities and relations (groups) corresponding to activity patterns in the world-view graph (element 2228) is then conducted. In an indicator generation and alerting module (element 2230), entity (node) and relation (edge) correspondence indicators are ranked (element 2232). If the ranking exceeds a specified threshold, an alert is generated and transmitted. Next, indicators in temporal changes of activity patterns are ranked (element 2234). If the ranking exceeds a specified threshold, an alert is generated and transmitted. Finally, partial pattern matches in the world-view graph are ranked, and an alert is generated and transmitted if the ranking exceeds a specified threshold (element 2236). The alert is the ranked list of individuals (inferred by CANON) that are involved in the adversarial activity described in the VAST challenge that can be directly displayed (via a computer monitory or other display screen) to the end users (system analysts). A specific threshold can be determined empirically based on the "suspicious" scores assigned to the nodes. For instance, if there is a clear bi-modal distribution among the node scores, one can use that as a threshold. More commonly, system analysts will specify CANON to return the top-k nodes. In this case, the system will simply sort the nodes based on the "suspicious" scores and then output the top-k.

In summary, the described invention, CANON (Complex Analytics of Network of Networks) (element 400), is a unique computational system capable of producing high-confidence indicators and warnings of adversarial activities, such as smuggling, human trafficking, illicit drug production, and activities linked to weapon of mass terrorism. The system first constructs a unified worldview network/graph (element 900) by aligning and fusing transaction data originating from different intelligence sources (element 302), and subsequently detect and match indicating patterns (i.e., Activity Detection (element 306)) to recognize the underlining adversarial activities in the integrated worldview. This idea translates to two key components in the CANON system (element 400). The first component is an optimization-based network alignment method (i.e., Graph Merging (element 304)) for mapping heterogeneous, multi-source intelligence data into a unified, expressive worldview representation with a high accuracy and at a massive scale involving upwards of millions of nodes. The second component is robust and efficient activity-detection capabilities (i.e., Activity Detection (element 306)) based on fast approximate attributed subgraph matching algorithms for richly attributed networks to support expressive, realistic queries of complex activity pathways. For the first time, CANON (element 400) delivers an integrated framework addressing two of the foremost challenges in modeling adversarial activities: "connecting the dots" and "finding a needle in a haystack", as illustrated in FIG. 3.

Figure 23:
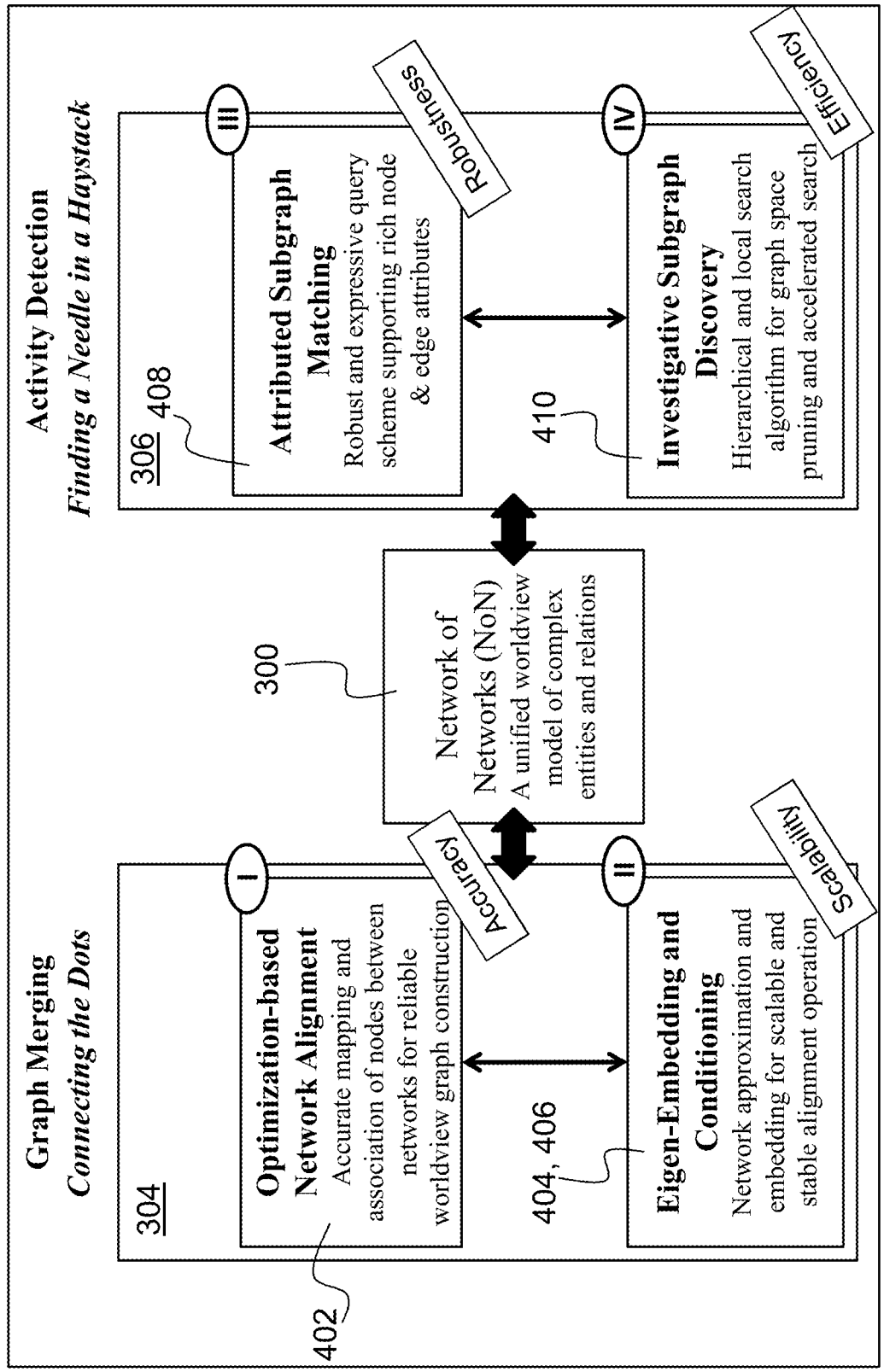
FIG. 23 is an illustration of Graph Merging and Activity Detection according to some embodiments of the present disclosure.

One purpose of the system described herein is to provide a unique mathematical and computational methods for an integrated analysis of multiple dynamic and heterogeneous networks that will have a direct impact on modeling adversarial activities. The invention will improve the current state-of-the-art in four areas: accuracy, scalability, robustness, and efficiency. Regarding accuracy, the optimization-based network alignment method (element 402) enables accurate mapping and association of nodes between different intelligence networks for reliable worldview graph construction. Regarding scalability, the eigen-embedding and conditioning method (elements 404 and 406) approximates the input networks by leveraging their intrinsic properties and enables substantial improvement on the scalability of the framework (i.e., handling networks with millions of nodes). Regarding robustness, the attributed subgraph matching method (element 408) enables robust and expressive query schema, which allows for matching complex and realistic activity pathways from real-world scenarios (to the worldview graph). Regarding efficiency, the investigative subgraph discovery method (element 410) enables fast identification of suspicious, atypical and abnormal subgraph regions which correspond to adversarial activities. FIG. 23 illustrates the four areas of accuracy, scalability, robustness, and efficiency, as described above.

The invention described herein has several real-world applications including identifying adversarial insider threats for intelligence community customers, modeling the internet of things (IoT) for anomalies detections, detect and trace counterfeit parts from supply-chain networks for manufacturers (e.g., vehicle manufacturer). Once an anomaly or adversarial activity is detected, an alert can be generated and sent to end-users by providing a ranked list of suspicious individuals and/or organization that participate in adversarial activities.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for producing indicators and warnings of adversarial activities, the system comprising:
one or more processors and a non-transitory computer-readable medium having executable instructions encoded thereon such that when executed, the one or more processors perform operations of:
receiving a plurality of networks of transactional data from different sources, wherein each network of transactional data comprises a plurality of nodes and edges connecting nodes, wherein each node represents an entity and each edge represents a relation between entities;
generating a worldview graph by merging the plurality of networks of transactional data;
identifying a set of suspicious subgraph regions in the worldview graph through activity detection, comprising:
performing a query of the worldview graph with a query graph describing a pathway template of a specific adversarial activity;
identifying a set of subgraph regions that match the query graph, resulting in the set of suspicious subgraph regions;
ranking the set of suspicious subgraph regions based on similarity to the query graph; and
outputting a ranked list of the set of suspicious subgraph regions to an end-user; and
based on the set of suspicious subgraph regions, generating and transmitting an alert of the adversarial activity.

2. The system as set forth in claim 1, wherein the plurality of networks of transactional data are merged together using an optimization-based alignment framework based on a combination of topological features of the plurality of networks of transactional data and attribute information related to the plurality of nodes.

3. The system as set forth in claim 2, wherein the one or more processors further perform operations of:
approximating adjacency matrices of the plurality of networks of transactional data via a rank-r eigen-value decomposition; and
using the optimization-based alignment framework, performing an optimization based on a joint matrix composed of the approximated adjacency matrices.

4. The system as set forth in claim 3, wherein the one or more processors perform an operation of conducting a preconditioning step between pairs of communities in adjacency matrices prior to generation of the joint matrix.

5. A computer implemented method for producing indicators and warnings of adversarial activities, the method comprising an act of:
causing one or more processors to execute instructions encoded on a non-transitory computer-readable medium, such that upon execution, the one or more processors perform operations of:
receiving a plurality of networks of transactional data from different sources, wherein each network of transactional data comprises a plurality of nodes and edges connecting nodes, wherein each node represents an entity and each edge represents a relation between entities;
generating a worldview graph by merging the plurality of networks of transactional data;
identifying a set of suspicious subgraph regions in the worldview graph through activity detection, comprising:
performing a query of the worldview graph with a query graph describing a pathway template of a specific adversarial activity;

identifying a set of subgraph regions that match the query graph, resulting in the set of suspicious subgraph regions;

ranking the set of suspicious subgraph regions based on similarity to the query graph; and outputting a ranked list of the set of suspicious subgraph regions to an end-user; and based on the set of suspicious subgraph regions, generating and transmitting an alert of the adversarial activity.

6. The method as set forth in claim 5, wherein the plurality of networks of transactional data are merged together using an optimization-based alignment framework based on a combination of topological features of the plurality of networks of transactional data and attribute information related to the plurality of nodes.

7. The method as set forth in claim 6, wherein the one or more processors further perform operations of:

approximating adjacency matrices of the plurality of networks of transactional data via a rank-r eigen-value decomposition; and using the optimization-based alignment framework, performing an optimization based on a joint matrix composed of the approximated adjacency matrices.

8. The method as set forth in claim 7, wherein the one or more processors perform an operation of conducting a preconditioning step between pairs of communities in adjacency matrices prior to generation of the joint matrix.

9. A computer program product for producing indicators and warnings of adversarial activities, the computer program product comprising:

computer-readable instructions stored on a non-transitory computer-readable medium that are executable by a computer having one or more processors for causing the processor to perform operations of:

receiving a plurality of networks of transactional data from different sources, wherein each network of transactional data comprises a plurality of nodes and edges connecting nodes, wherein each node represents an entity and each edge represents a relation between entities;

generating a worldview graph by merging the plurality of networks of transactional data;

identifying a set of suspicious subgraph regions in the worldview graph, through activity detection, comprising:

performing a query of the worldview graph with a query graph describing a pathway template of a specific adversarial activity;

identifying a set of subgraph regions that match the query graph, resulting in the set of suspicious subgraph regions;

ranking the set of suspicious subgraph regions based on similarity to the query graph; and outputting a ranked list of the set of suspicious subgraph regions to an end-user; and based on the set of suspicious subgraph regions, generating and transmitting an alert of the adversarial activity.

10. The computer program product as set forth in claim 9, wherein the plurality of networks of transactional data are merged together using an optimization-based alignment framework based on a combination of topological features of the plurality of networks of transactional data and attribute information related to the plurality of nodes.

11. The computer program product as set forth in claim 10, wherein the one or more processors further perform operations of:

approximating adjacency matrices of the plurality of networks of transactional data via a rank-r eigen-value decomposition; and using the optimization-based alignment framework, performing an optimization based on a joint matrix composed of the approximated adjacency matrices.

12. The computer program product as set forth in claim 11, wherein the one or more processors perform an operation of conducting a preconditioning step between pairs of communities in adjacency matrices prior to generation of the joint matrix.

* * * * *